United States Patent [19]

Chiappetta et al.

[11] Patent Number: 5,196,857
[45] Date of Patent: Mar. 23, 1993

[54] STOWABLE AND DEPLOYABLE ANTENNA ARRAY

[75] Inventors: Frank R. Chiappetta, Berwyn; Christopher L. Frame, King of Prussia; Kenneth L. Johnson, Eagleville, all of Pa.

[73] Assignee: General Electric Company, East Windsor, N.J.

[21] Appl. No.: 709,736

[22] Filed: Jun. 3, 1991

[51] Int. Cl.$^5$ .......................... H01Q 1/08; H01Q 1/12; B64G 1/44
[52] U.S. Cl. .............................. 343/881; 343/DIG. 2; 244/173
[58] Field of Search ................................ 343/880–883, 343/DIG. 2, 915; 244/173; 248/174; 52/79.5, 645, 646

[56] References Cited

U.S. PATENT DOCUMENTS

| 3,951,730 | 4/1976 | Wennberg et al. | 248/174 |
| 4,343,005 | 8/1982 | Han et al. | 343/DIG. 2 |
| 4,666,107 | 5/1987 | Berry | 244/173 |
| 4,864,784 | 9/1989 | Binge et al. | 52/108 |
| 4,977,408 | 12/1990 | Harper et al. | 343/792.5 |

Primary Examiner—Rolf Hille
Assistant Examiner—Peter Toby Brown
Attorney, Agent, or Firm—William H. Meise; Stephen A. Young; Clement A. Berard

[57] ABSTRACT

A stowable and self-deployable array antenna includes flat, rectangular antenna panels hinged side-by-side so that when deployed they are coplanar, and they fold like an accordion for stowing. The deployed array antenna is stiffened by lateral stiffening panels hingedly attached to every other hinge between antenna panels, and to the unhinged ends of the antenna panels. Foldable longitudinal stiffening panels are hinged between adjacent lateral stiffening panels. Each hinged connection includes a pair of thin spring elements, corresponding to a portion of a cylinder. The two spring elements of each hinge are spaced apart with their concave sides facing, and with the axes of the defining cylinder parallel. The hinge pivots, when the spring elements buckle, about a line orthogonal to a line extending between the cylinder axes. The hinges are used as the structural elements of self-deployable masts. The mast may have a polygonal cross-section.

14 Claims, 19 Drawing Sheets

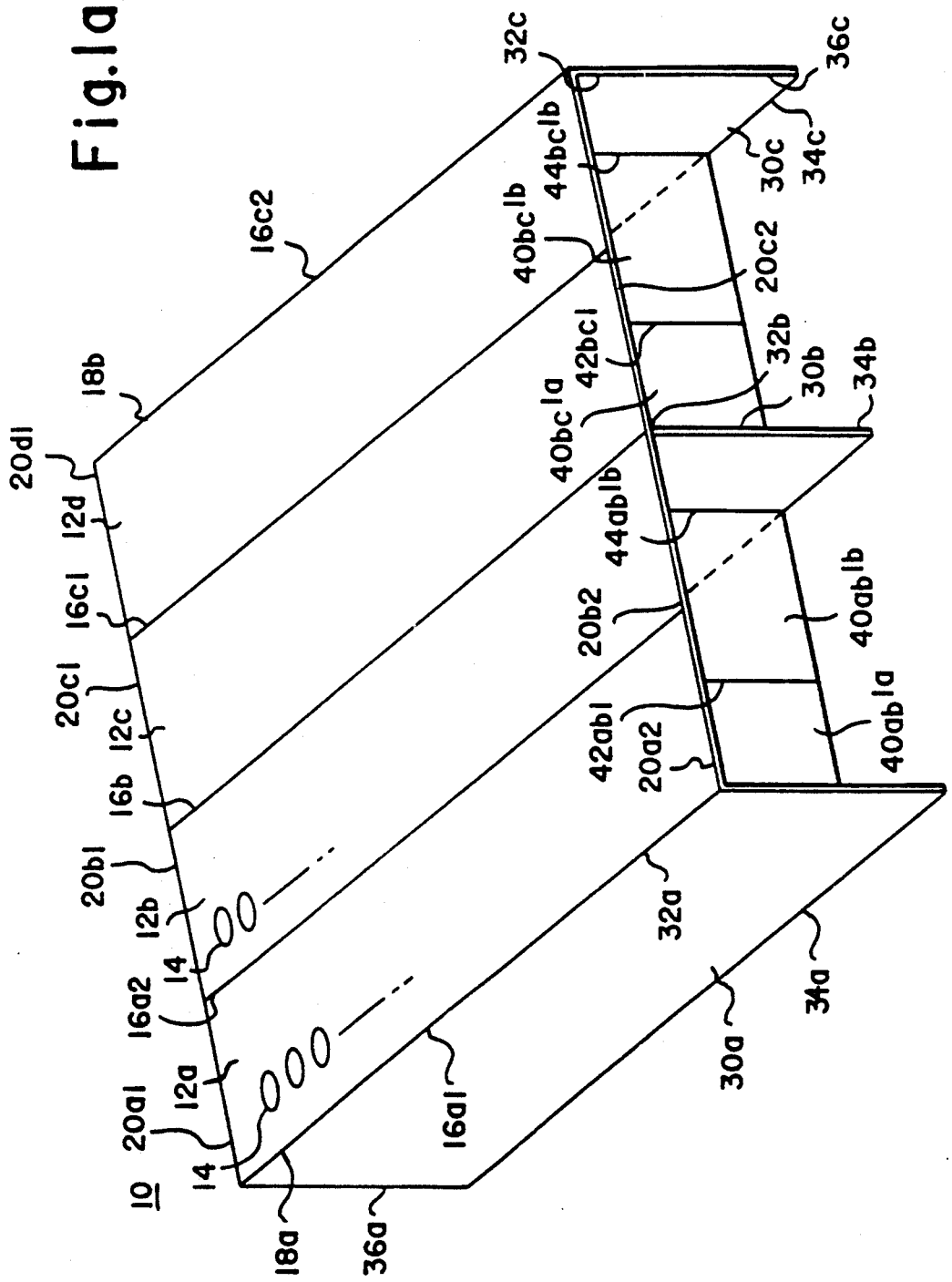

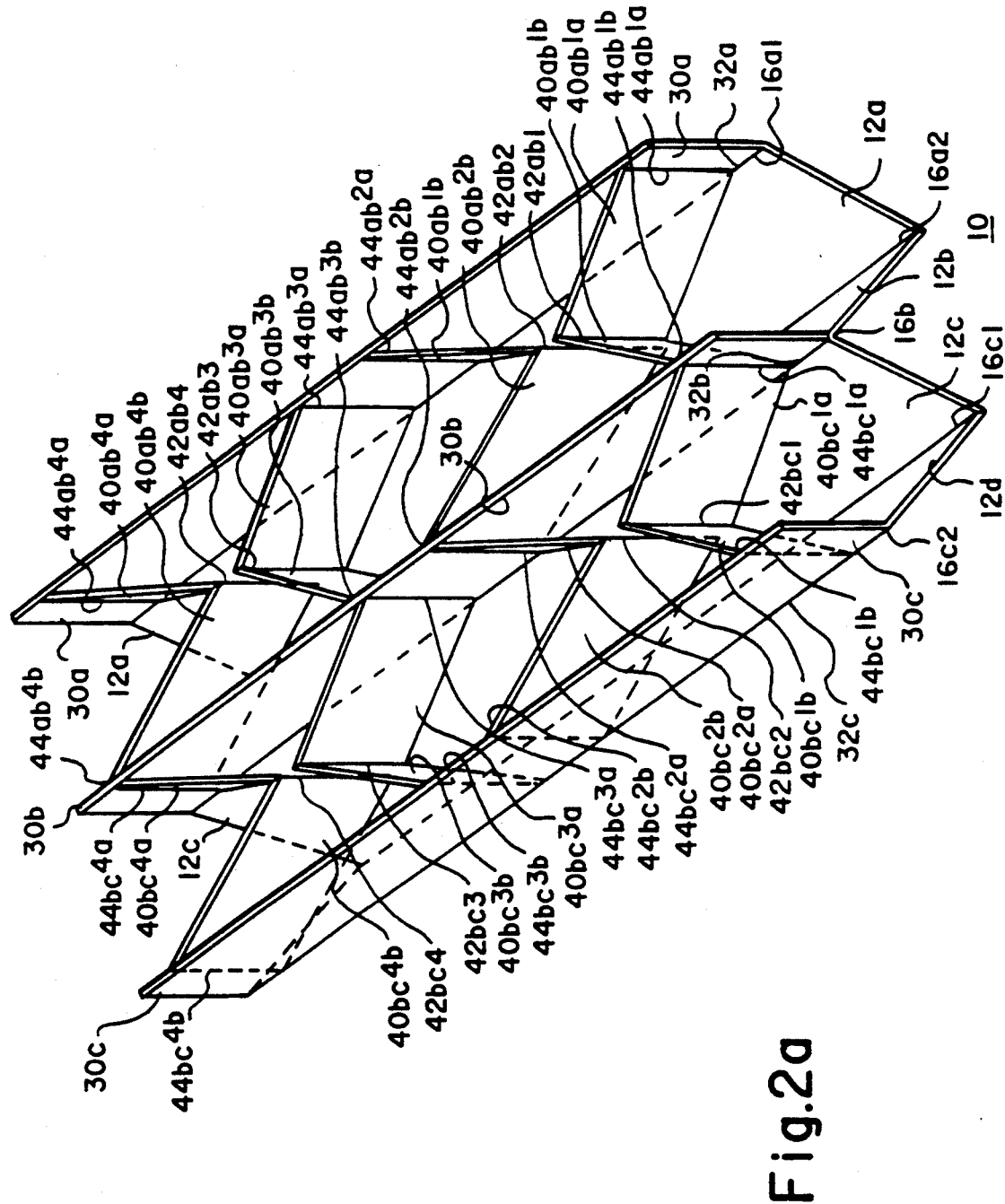

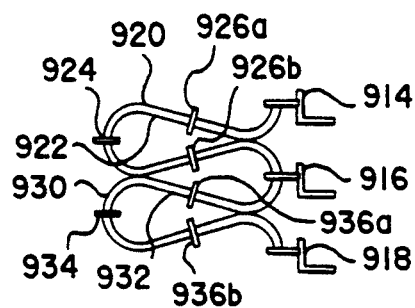
Fig.9d
Fig.10a
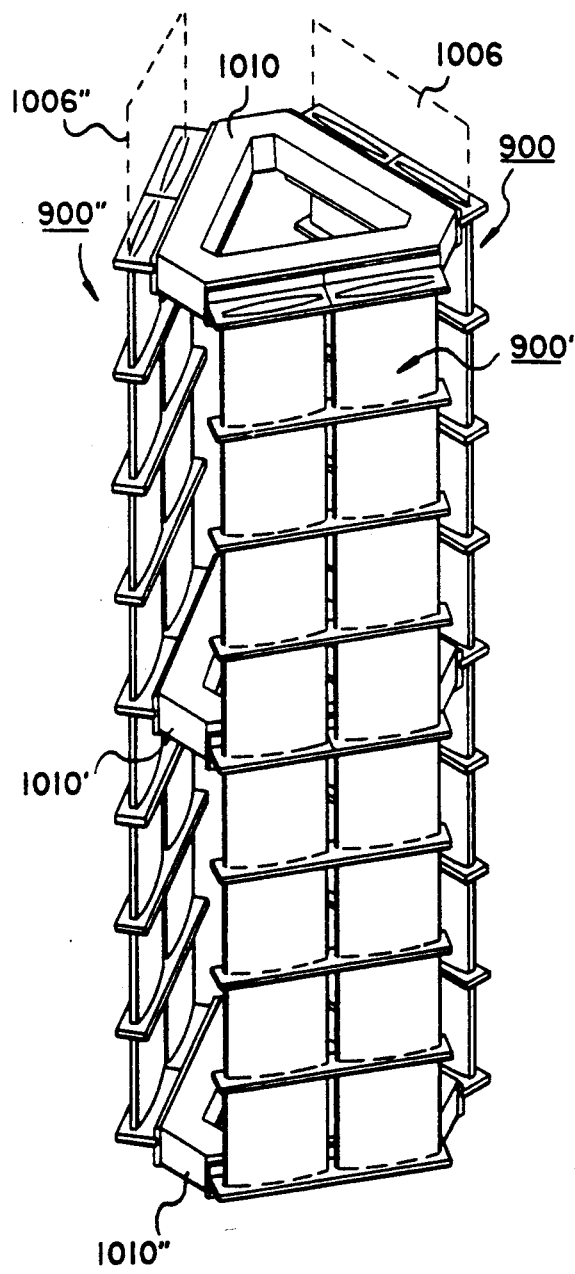
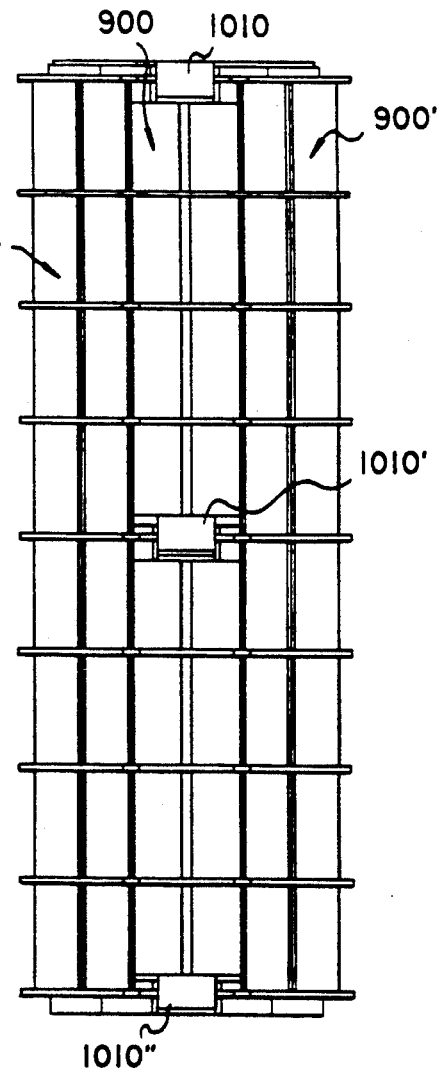
Fig.10c

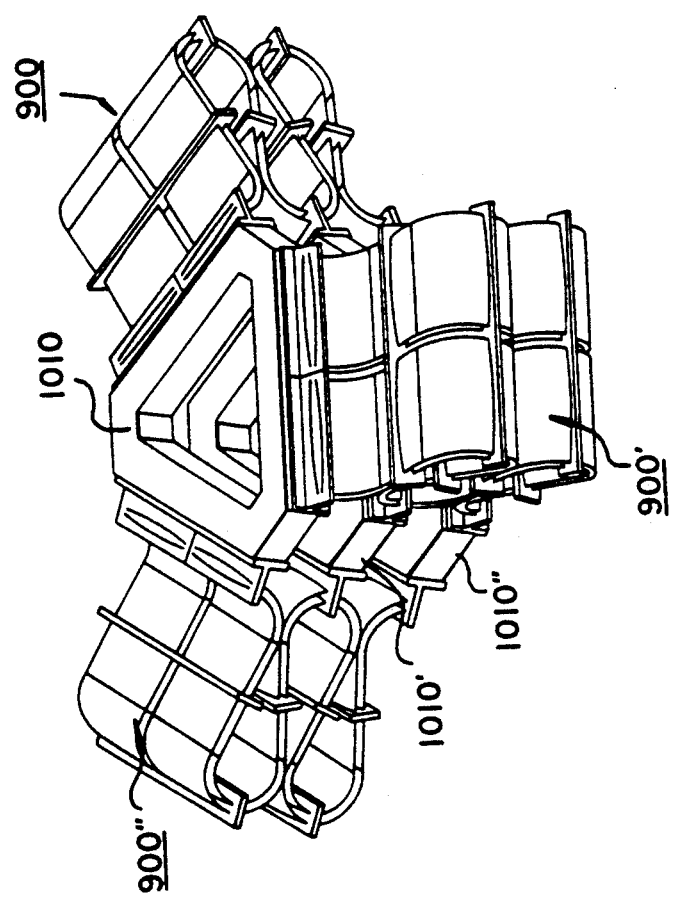
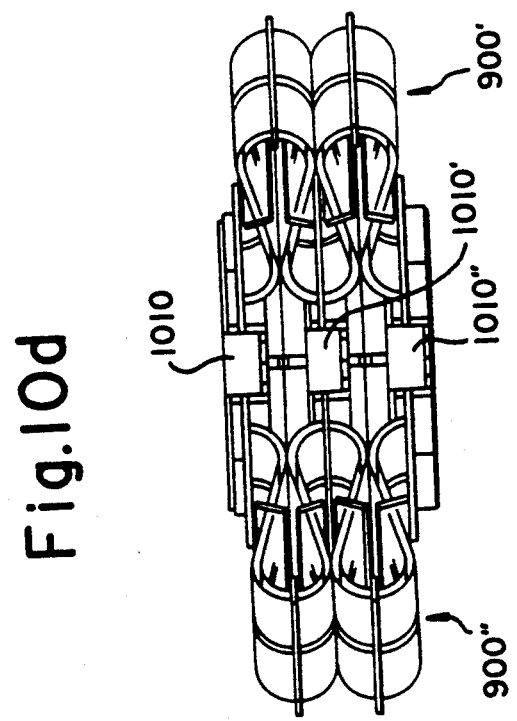

Fig.13b
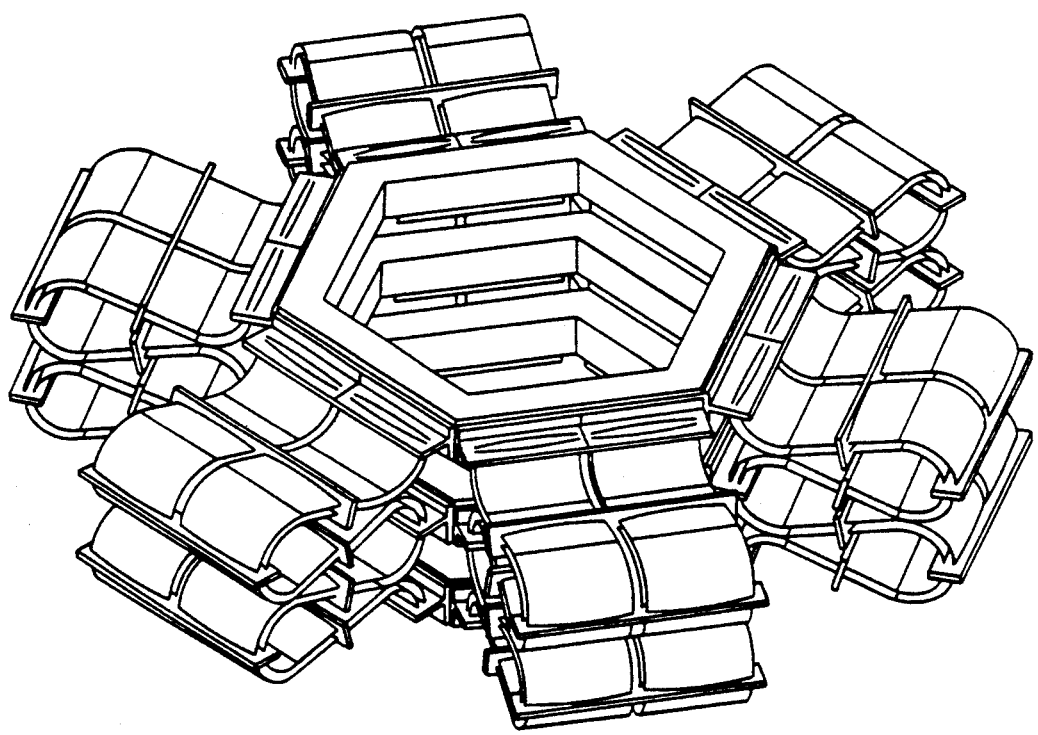
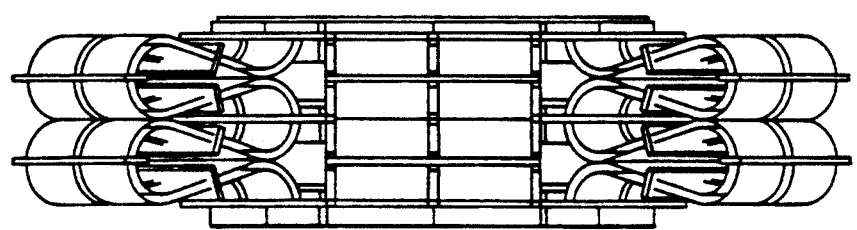
Fig.13c

Fig.14a
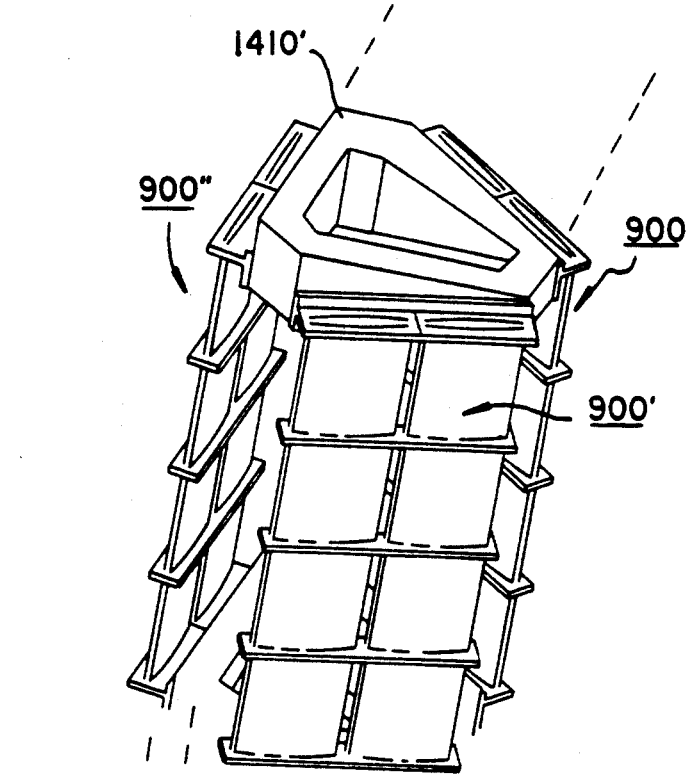
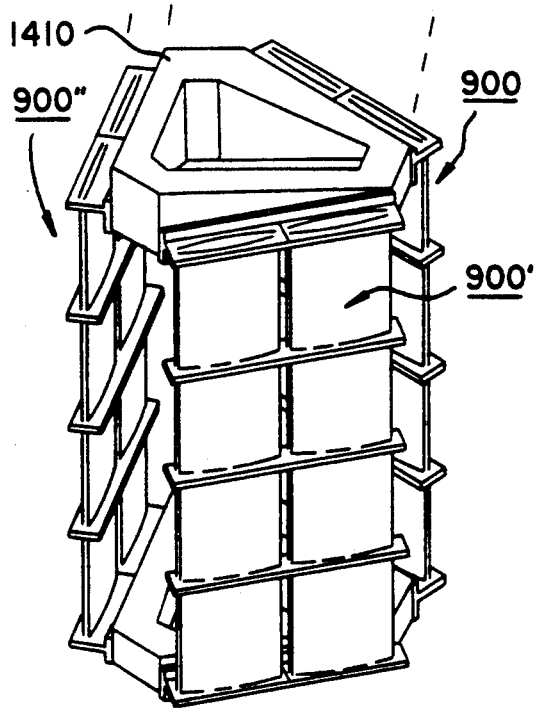
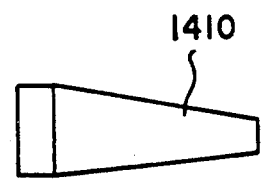
Fig.14b

STOWABLE AND DEPLOYABLE ANTENNA ARRAY

BACKGROUND OF THE INVENTION

This invention relates to stowable and deployable structures useful for antenna and solar cell arrays, and particularly to such structures which are useful in the context of space vehicles.

A recurring problem associated with spacecraft is that of stowing the complete spacecraft in a transport vehicle or booster for transport of the spacecraft from the Earth's surface into space, and upon its arrival in space deploying the structures of the spacecraft into a usable configuration. This problem comes about because vehicles adapted for lifting a load from the earth's surface into an orbit require a streamlined shape because of aerodynamic considerations. For example, unmanned booster vehicles ordinarily carry their payload in a fairing or tapered nose cone. The space shuttle bay is more nearly cylindrical in form, but is limited both in length and diameter. Ordinarily, spacecraft structures such as antennas, sensing instruments and probes, and solar panels are collapsed to dimensions within an envelope which will fit within the limitations of the boost vehicle, and are then unfurled or extended in space.

Advancing levels of technology tend to require larger solar panels because of greater power demands, and larger and more complex antenna structures for generating directional antenna beams. Parenthetically, it should be noted that the term antenna beams refers to beam shaping in both transmission and reception modes, both modes of operation being understood even though only one mode is mentioned. The requirement for larger deployed structures can be fulfilled by larger boost vehicles or by advanced stowing and deployment techniques. The use of larger boost vehicles may not be possible because such vehicles are unavailable, cannot be scheduled, or are too expensive.

In general, the performance of an antenna depends upon its configuration or shape as well as upon its size. A large antenna array will not operate properly if its deployed configuration does not meet its planar flatness or its dimensional accuracy requirements. Furthermore, the deployed antenna should resist changes in its configuration or dimensions attributable to temperature or external forces to which it may from time to time be subjected. Thus, rigidity and dimensional stability are among the desirable attributes of a deployable antenna. Among the known types of deployable antennas are the array antennas, in which the array is supported on a plurality of panels which are folded for stowing, and unfolded into the desired configuration. The stowed volume of an array antenna comprised of panels depends upon the deployed area of the panels, and also on the thickness of the panels. In order to reduce stowed volume for a given deployed area, it would appear that one could merely reduce the thickness of the panels. The reduction of thickness, however, reduces the ability of the deployed structure to resist deformation. An improved antenna structure is desired.

SUMMARY OF THE INVENTION

A plurality of support panels (antenna panels), each supporting at least one antenna element or solar cell, are attached side-to-side at hinged connections to form an array. A lateral stiffening panel is attached to every other one of the hinged connections between the antenna panels, and to the end antenna panels of the array. The antenna panels are stowed by accordion-like folding at the hinged connections between the antenna panels, with the lateral stiffening panels outside the accordion-stowed antenna panels. A plurality of foldable longitudinal stiffening panels extend between the lateral stiffening panels to form a structure which, when deployed, supports the deployed antenna array with an "egg-crate" infrastructure. In a particular embodiment of the invention, the hinged connections between the various panels is provided by hinges comprising curved spring members. Each hinge includes first and second spring elements, each in the form of a portion of a circular cylinder having a radius of curvature. The two spring elements are precisely spaced apart with their concave faces facing each other, and with their ends connecting the two panels which are to be hinged. The antenna array is stowed by folding the array at the hinge points, which causes buckling of the spring elements of each hinge. The buckling stores energy in the hinge which is available for deploying the array. In other embodiments of the invention, the hinge elements are cascaded to form deployable masts.

DESCRIPTION OF THE DRAWING

FIGS. 1a and 1b are simplified perspective or isometric views of the top and bottom of a stowable and deployable antenna array in accordance with the invention;

FIG. 2a is a perspective or isometric view of the antenna array of FIG. 1 in a state intermediate between the stowed and deployed conditions.

FIGS. 4a and 4b are referred to jointly as FIG. 4.

FIGS. 6a and 6b are referred to jointly as FIG. 6;

FIGS. 9c and 9d are side elevation views of FIGS. 9a and 9b, respectively, FIGS. 9a, b, c and d are referred to jointly as FIG. 9;

FIGS. 10a and 10b are perspective or isometric views of a triangular mast according to an aspect of the invention, in the extended or deployed state and in the collapsed or stowed state, respectively, and FIGS. 10c and 10d are side elevation views of FIGS. 10a and 10b, respectively, FIGS. 10a, b, c and d are referred to jointly as FIG. 10;

FIGS. 11a and 11b are referred to together as FIG. 11;

FIGS. 12a, b and c are referred to jointly as FIG. 12;

FIGS. 13a and 13b are perspective or isometric views of a hexagonal mast according to an aspect of the invention, in the deployed and stowed state, respectively, and FIG. 13c is a side elevation view of the mast of FIG. 13b; FIGS. 13a, b and c are referred to jointly as FIG. 13;

FIG. 14a is a perspective or isometric view of mast sections coupled in cascade or end-to-end with an angled or tapered coupling element for causing the extended mast to assume a segmented curved shape, and FIG. 14b is a side elevation view of a tapered or wedge-shaped coupling element.

DESCRIPTION OF THE INVENTION

Figure 1B:
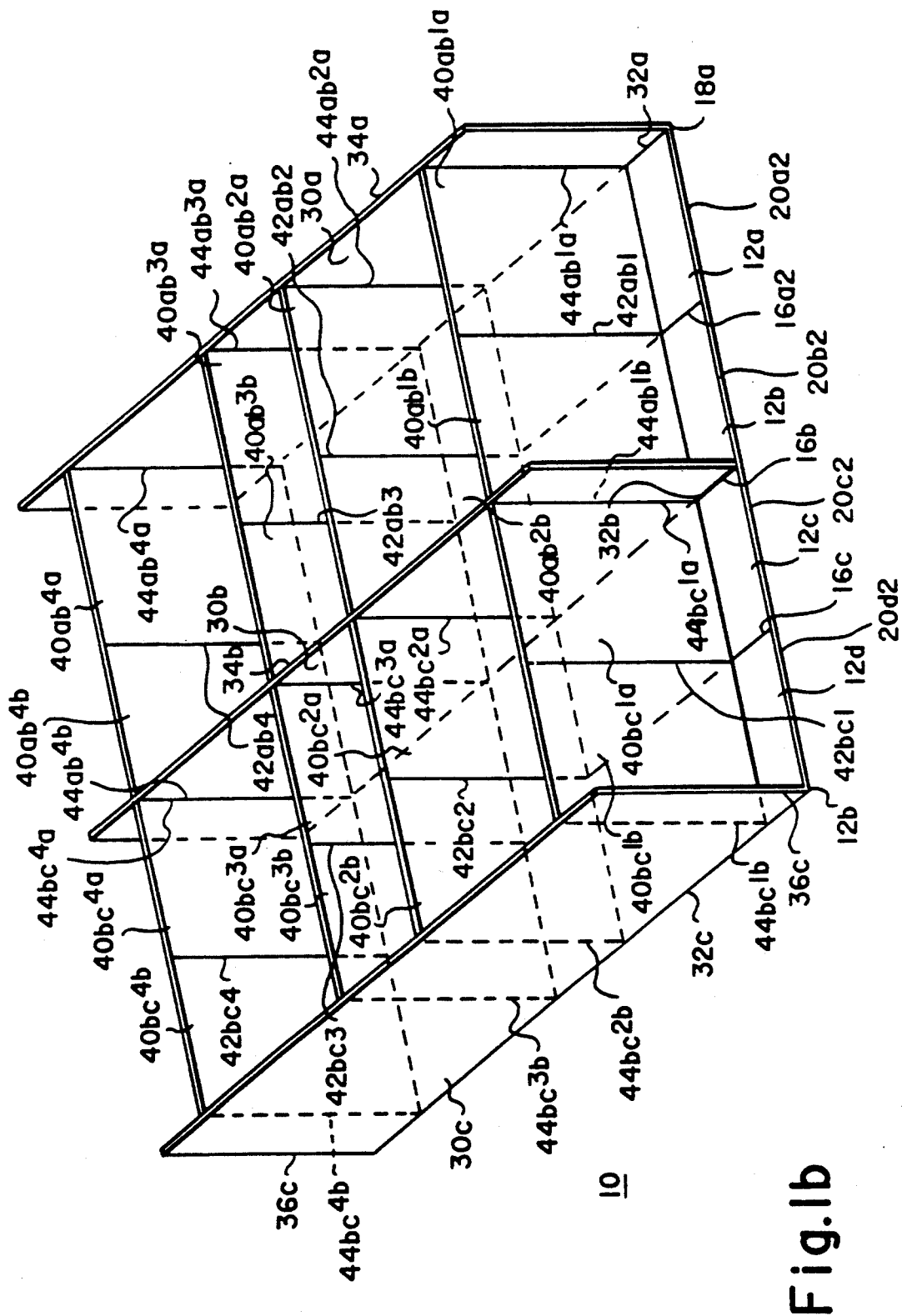

FIGS. 1a and 1b, referred to jointly as FIG. 1, are perspective or isometric views of the (a) top or radiating side and (b) the bottom, support or infrastructure sides, respectively, of an array antenna 10 in accordance with an aspect of the invention, illustrated in a fully deployed state. In FIG. 1, array antenna 10 includes thin, flat, rectangular antenna support panels 12a, 12b, 12c and 12d. Each antenna panel supports one or more flat antenna elements, some of which are illustrated as 14. The thickness of panels 12 is small relative to their other dimensions. Each antenna panel 12 has two shorter sides 20. For example, panel 12a has two ends 20a1 and 20c2, between which the length or major dimension of the panel is defined. Similarly, antenna panel 12b has ends 20b1 and 20b2, between which the length is defined. Each antenna panel 12 also includes a pair of long sides 16, between which the width of the panel is defined. Each antenna panel 12 also includes a pair of 16a 1 and 16a2, between which the width of the panel is defined. In the simplified illustration of the FIG. 1, the adjoining long edges of antenna panels 12a and 12b are superposed and not differentiated, so both together are designated 16a2. Similarly, the superposed edges of antenna panels 12b and 12c are together designated 16b. According to an aspect of the invention, the long edges 16 of antenna panels 12 are joined together with hinges so that, as described below, they may be stowed by accordion-like collapsing along the hinged connections.

As so far described, deployed antenna panels 12a, 12b ... of array antenna 10 constitutes a relatively large, thin structure with hinges located along various lines. As the thickness of the individual panels is reduced in order to reduce the stowed volume, the structural rigidity of the resulting antenna is reduced. Consequently, additional structural mass must be added to provide sufficient rigidity to meet overall stiffness requirements. It has been discovered that, rather than adding structural mass to the antenna panels 12 themselves, reduced stowed volume for a given stiffness is achieved if the structural mass is added instead to a plurality of stiffening panels, as described in greater detail below.

As illustrated in FIG. 1, additional stiffness is provided by a plurality of thin, rectangular lateral stiffening panels 30 connected to the hinges joining antenna panels 12. The hinged connection between the lateral stiffening panel and the antenna panel is designated 32. In FIG. 1, a lateral stiffening panel 30b is connected along its long edges to the hinged juncture 16b between antenna panels 12b and 12c. The hinged connection between lateral stiffening panel 30b and antenna panels 12b and 12c is designated 32b. An intermediate lateral stiffening panel 30 is coupled to every other (alternate) juncture between antenna panels. For example, intermediate lateral stiffening panel 30b is associated with the juncture between antenna 12b and 12c, but no lateral stiffening panel is provided between antenna panels 12a and 12b, nor between antenna panels 12c and 12d. Only one such intermediate lateral stiffening panel, namely panel 30b, is illustrated in FIG. 1, because the simplified structure illustrated therein has only four antenna panels. When a larger number of antenna panels is used in the array, there will be a larger number of intermediate lateral stiffening panels 30. In addition to intermediate lateral stiffening panels 30, two end lateral stiffening panels, illustrated as 30a and 30c, are joined along hinged connections 32a and 32c to the free ends (the long edges not joined to another panel) of antenna panels 12a and 12d.

As so far described, the antenna array panels are stiffened in a direction parallel to the hinges between antenna panels by a plurality of lateral stiffening panels. Stiffening is provided in a direction transverse to antenna panel hinges 16 by a plurality of foldable longitudinal stiffening panels which extend from each lateral stiffening panel, whether intermediate or end, to the next adjacent lateral stiffening panel. As illustrated FIG. 1, the foldable longitudinal stiffening panels are designated as 40. For example, a foldable longitudinal stiffening panel consisting of sections $40ab^{1a}$ and $40ab^{1b}$ extends between lateral stiffening panels 30a and 30b, where the "ab" portion of the designation identifies the longitudinal stiffening panel as extending between lateral stiffening : panels 30 "a" and 30 "b", and the superscript indicates by the numeral the particular longitudinal stiffening panel, and the superscript letter indicates the half-portion of the longitudinal stiffening panel. Another longitudinal stiffening panel including half-portions $40ab^{2a}$ and $40ab^{2b}$ also extends between lateral stiffening panels 30a and 30b. Two more such longitudinal stiffening panels extend between lateral stiffening panels 30a and 30b, namely a longitudinal stiffening panel consisting of sections $40ab^{3a}$ and $40ab^{3b}$ and $40ab^{4a}$ and $40ab^{4b}$. An additional set of longitudinal stiffening panels extends between lateral stiffening panels 30b and 30c. These longitudinal stiffening panels are $40bc^{1a}$, $40bc^{1b}$; $40bc^{2a}$, $40bc^{2b}$; $40bc^{3a}$, $40bc^{3b}$; and $40bc^{4a}$, $40bc^{4b}$. Each of longitudinal stiffening panels 40 is hinged along the line joining its two sections. For example, longitudinal stiffening panel portions $40ab^{1a}$ and $40ab^{1b}$ are hinged along their joining lines $42ab^1$. Similarly, longitudinal stiffening panel portions $40ab^{2a}$ and $40ab^{2b}$ are hinged along their joining line $42ab^2$. As a last example, longitudinal stiffening panel portions $40bc^{1a}$ and $40bc^{1b}$ are hinged along their joining line $42bc^1$. Also, each longitudinal stiffening panel is hinged to the lateral stiffening panels with which it is associated. For example, longitudinal stiffening half-panel $40ab^{1a}$ is joined to end lateral stiffening panel 30a along a hinge line designated $44ab^{1a}$, and its mating longitudinal stiffening half-panel $40ab^{1b}$ is joined to intermediate lateral stiffening panel 30b along a hinge line $44ab^{1b}$. Similarly, longitudinal stiffening half-panel $40ab^{2a}$ is joined to end lateral stiffening panel 30 along a hinge line $44ab^{2a}$. As a final example, longitudinal stiffening half-panel 40bc³ᵃ is joined to intermediate lateral stiffening panel 30b along a hinge line 44bc³ᵃ.

FIG. 2a is a perspective or isometric view of the bottom of structure 10, in a state between the stowed and deployed states. Elements of FIG. 2a corresponding to those of FIG. 1 are designated by like reference numerals. As illustrated in FIG. 2a, antenna panels 12a, 12b, 12c, and 12d are folded like an accordion toward each other, bending along hinge lines 16a1, 16b, 16c1 and 16c2. As a result of the accordion fold of the antenna panels 12, the angle between the antenna panels and the associated lateral stiffening panels 30a, 30b and 30c changes, and the changes are accommodated by rotation about hinge lines 16a1, 16b and 16c2, correspond to hinge lines 32 in FIG. 2a. As a result, lateral stiffening panels 30a, 30b and 30c are closer together than in the deployed state illustrated in FIG. 1, and foldable longitudinal stiffening panels 40 fold along their center hinge lines 42 and along their hinges 44 with the lateral stiffening panels. It will be noted that the lateral stiffening panels and foldable longitudinal stiffening panels lie outside of the region into which the antenna panels fold like an accordion.

Figure 2B:
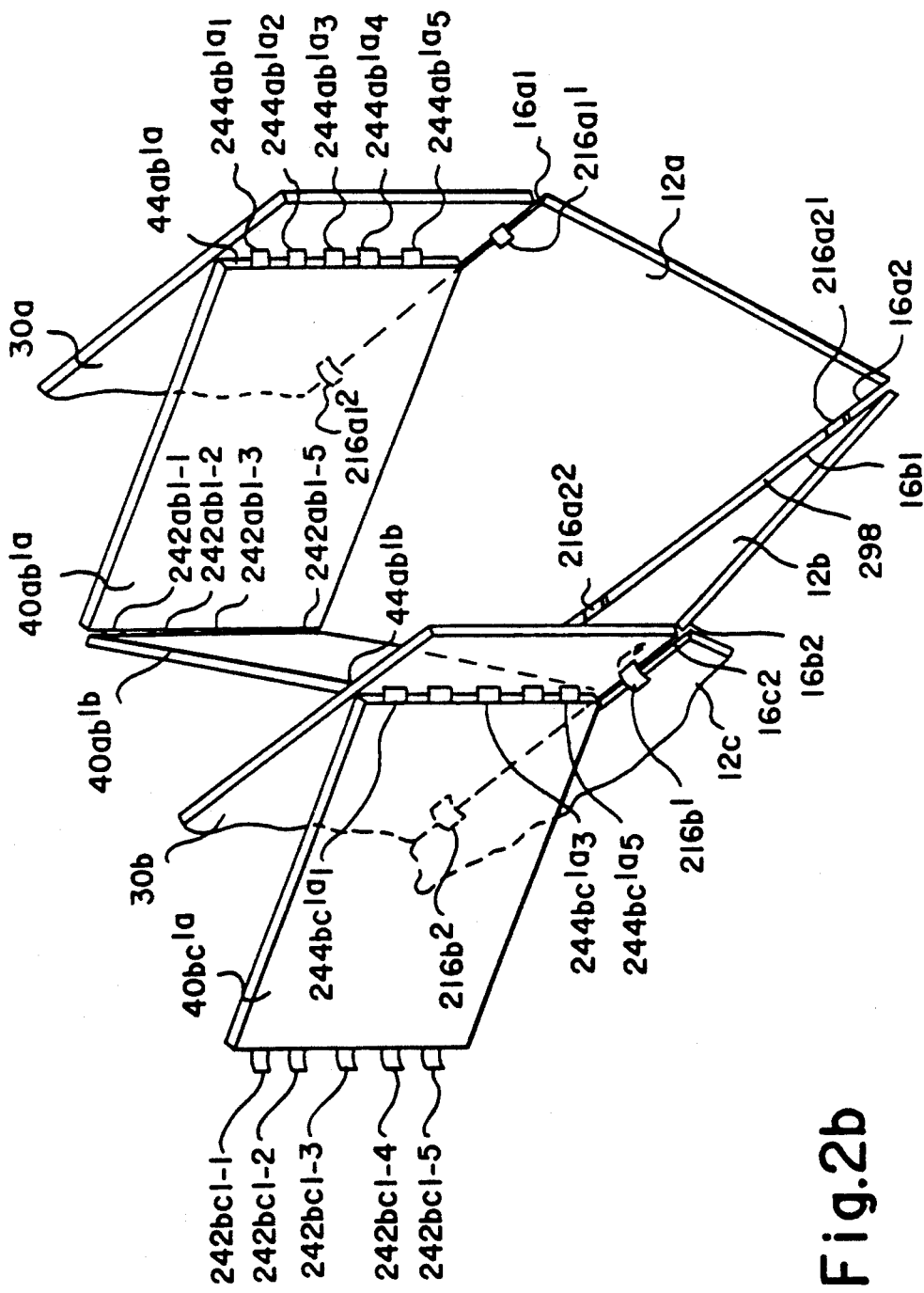
FIG. 2b is a detail thereof, illustrating the hinging of the various panels.

FIG. 2b is a detail of FIG. 2a. Elements corresponding to those of FIG. 2a are designated by like reference numerals, or by like reference numerals in the 200 series. In FIG. 2b, antenna panels 12a and 12b can be seen to be separated by a gap 298, and their two edges 16a2 and 16b1, respectively, are joined together by spaced-apart hinges $216a2^1$, $216a2^2$... There are several such hinges between antenna panels 12a and 12b along their lengths. Hinges 216a2 must be capable of 180° of rotation as the antenna panels go from deployed to the stowed condition. One side of each antenna panel 12 is hinged to a lateral stiffening panel 30. For example, antenna panel 12a, as illustrated in FIG. 2b, is attached along its long side 16a1 to lateral stiffening panel 30a by hinges $216a1^1$ and $216a1^2$, and there are several such hinges along the length of the juncture of panels 12a and 30a. Each hinge 216a1 provides for 90° rotation between stowed and deployed long side 16b2 to lateral stiffening panel 30b by portions of hinges $216b^1$ and $216b^2$, and to long edge 16c2 of antenna panel 12c by other portions of hinges $216b^1$ and $216b^2$, and there are several such hinges along the length of the juncture of panels 12b, 12c and 30b. Each longitudinal stiffening half-panel, such as half-panel $40ab^{1a}$, is attached to the adjacent lateral stiffening panel, such as 30a, by a set of hinges $244ab^{1a}1$, $244ab^{1a}2$, $244ab^{1a}3$, $244ab^{1a}4$, and $244ab^{1a}5$. Similarly, longitudinal stiffening half-panel $40bc^{1a}$ is hinged to lateral stiffening panel 30b by hinges $244bc^{1a}1$ through $244bc^{1a}5$, and these hinges must also provide 90° of rotation. The longitudinal stiffening half-panels, such as $40ab^{1a}$ and $40ab^{1b}$, are hinged together by a set of hinges 242ab1-1 through 242ab1-5, which must provide 180° of rotation. Other hinges in the entire antenna of FIG. 1 correspond to those described above.

Figure 3:
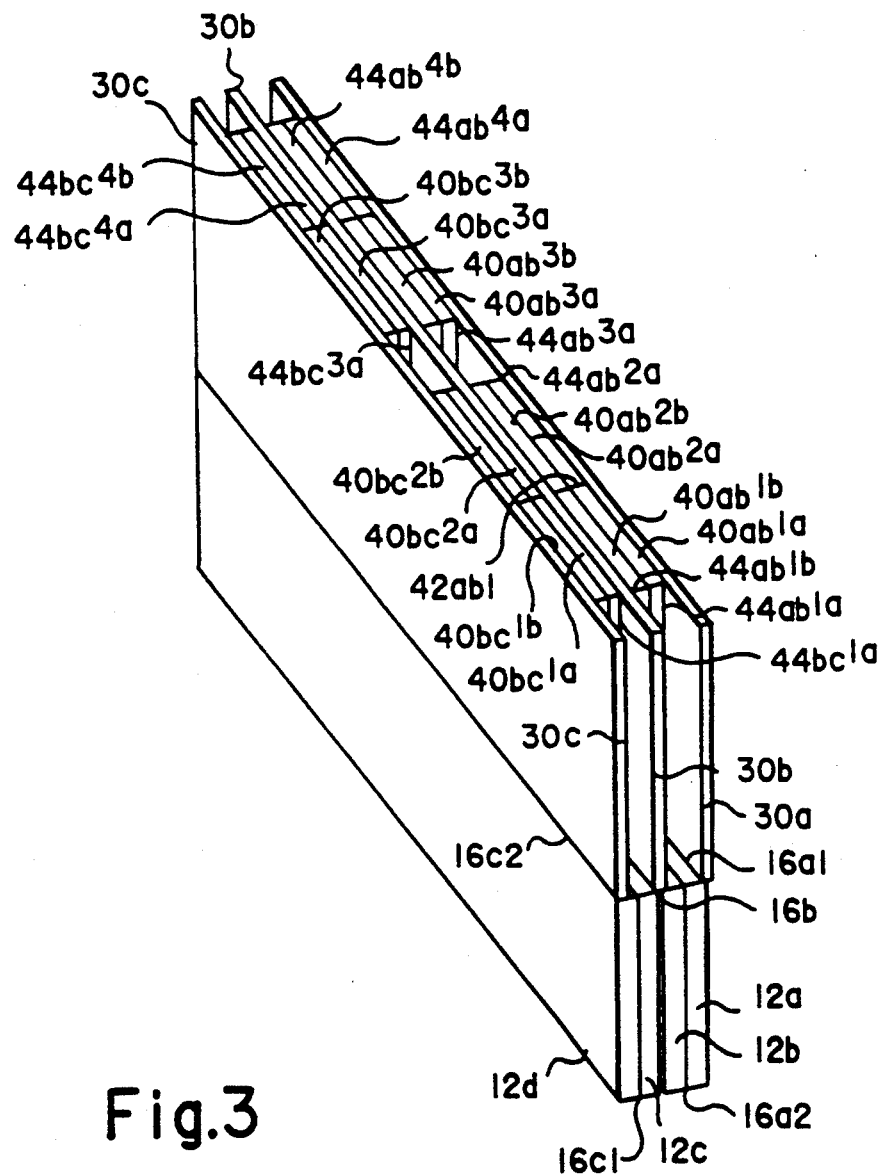
FIG. 3 illustrates the antenna array of FIG. 1 in its fully stowed state.

FIG. 3 illustrates the simplified structure of FIG. 1 in its collapsed or stowed state. Elements of FIG. 3 corresponding to those of FIGS. 1 and 2 are designated by like reference numerals. In FIG. 3, antenna panels 12a, 12b, 12c and 12d are folded together like an accordion, folding along hinge lines 16a1, 16a2, 16b, 16c1, and 16c2. This accordion-like folding is accompanied by folding of longitudinal support panels 40 along their center hinges 42 and their hinged attachments 44 to the lateral support panels 30. For example, longitudinal support half-panels $40ab^{1a}$ and $40ab^{1b}$ fold at their common hinged juncture 42ab1 and along hinges $44ab^{1a}$ and $44ab^{2b}$. The longitudinal panels thus folded are illustrated as butting or immediately adjoining the next adjacent folded longitudinal panels, as folded panels $44ab^{1a}$ and $44ab^{1b}$ are butted against the ends of folded panels $44ab^{2a}$ and $44ab^{2b}$, but the spacing may be such that they are separated in the stowed condition.

The structure of FIGS. 1, 2 and 3 has been described in the context of an antenna array. However, such a deployable structure may be used for support of solar cells, in which case the term "solar panel" would be used instead of "antenna-panel".

Figure 4A:
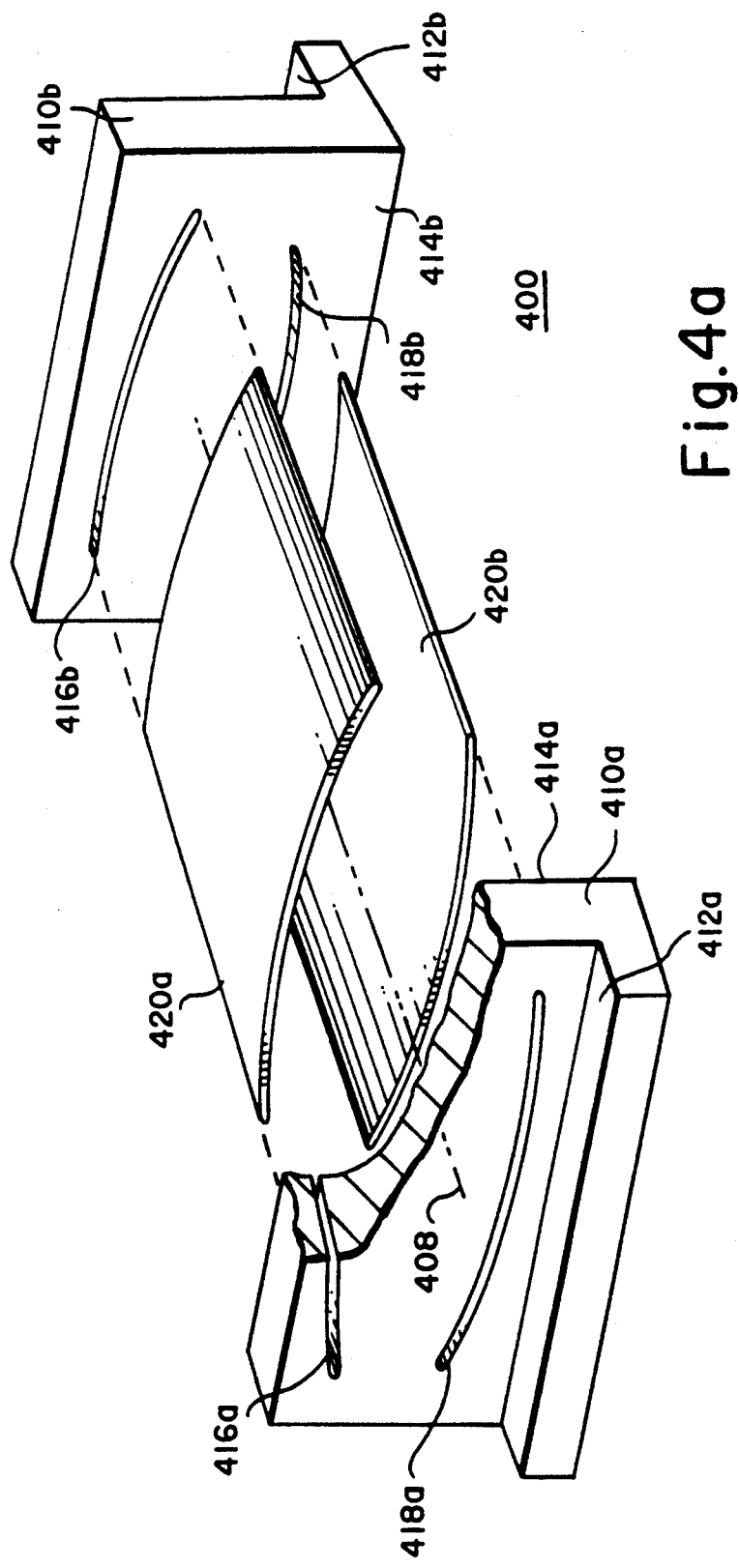
FIG. 4a is a perspective view or isometric view, partially exploded, of a hinge in accordance with an aspect of the invention.

FIG. 4a is an exploded view of a hinge which may be used in the array antenna of FIGS. 1, 2 and 3.

In FIG. 4a, a "zero tolerance" hinge 400 include first and second end support elements 410a and 410b, each of which includes a flange portion 412a, 412b which is adapted to be connected to the elements to be hinged, such as adjoining panels of array antenna 10. Support elements 410a and 410b each define facing surfaces 414a, 414b, which in the illustrated unstressed state are mutually parallel. A pair of curved slots 416a, 418a are cut through support element 410a, centered about an axis 408 orthogonal to faces 414a and 414b. A corresponding set of slots 416b, 418b are cut through support element 410b.

A pair of thin, curved spring elements 420a and 420b match the curvature of slots 416 and 418, respectively, and fit in the slots in the assembled state of hinge 400. Spring elements 420a and 420b are retained in slots 416a and b, and 418a and b, respectively. In one embodiment of the invention, spring elements 420 are made from beryllium-copper (Be-Cu), and support elements 410a and 410b are made from brass, with slots 416 and 418 cut therein by electrical discharge machining (EDM). With such a construction, springs 420 may be retained in slots 416, 418 by soldering. In a preferred embodiment of the invention, spring elements 420 are formed from carbon-fiber-reinforced epoxy approximately 0.010 inches in thickness, and support elements 410 are similarly made from carbon-fiber-reinforced epoxy, with the slot milled therein by laser. In the preferred embodiment, spring elements 420 are held in the slots by a cured epoxy resin. Those skilled in the art will recognize that hinge 400 includes a pair of spaced-apart structural members or beams extending between the support members.

Figure 4B:
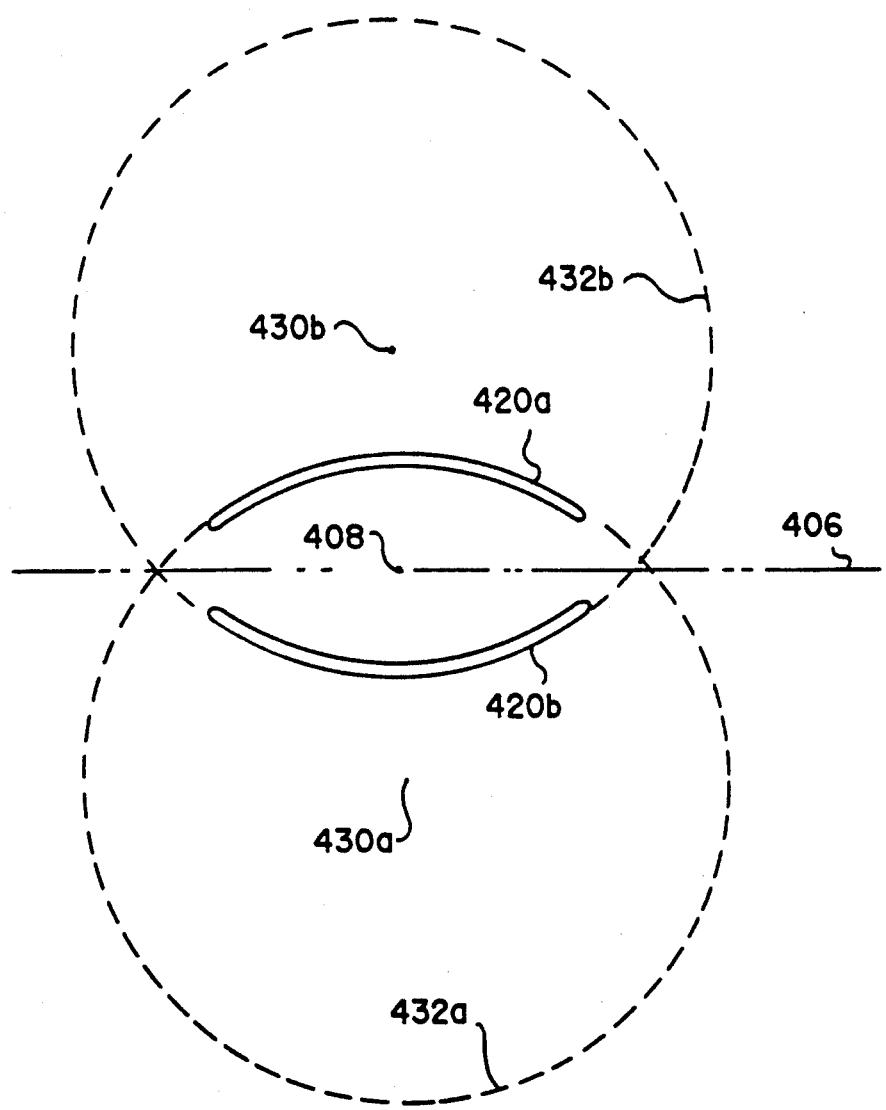
FIG. 4b is a schematic cross-section of the hinge of FIG. 4a, illustrating the construction.

FIG. 4b illustrate details of the curvature of spring elements 420a and 420b. In FIG. 4b, spring element 420a can be seen to be a portion of a cylinder 432a centered on an axis 430a extending parallel to axis 408. Similarly, spring element 420b is a corresponding portion of a cylinder 432b centered about an axis 430b parallel to and equidistant from axis 408. A plane of symmetry 406 which includes axis 408 lies equidistant from spring elements 420a and 420b.

Figure 5A:
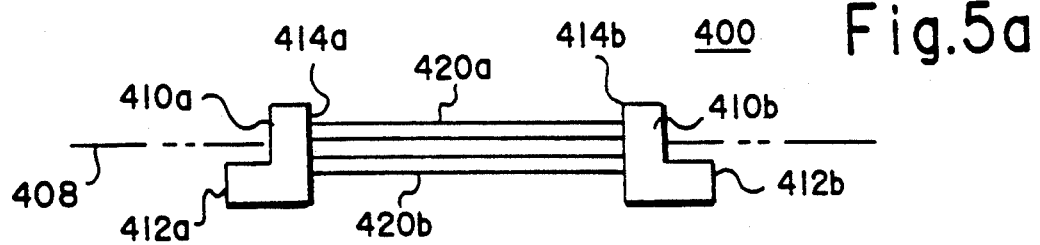
FIGS. 5a, b, and c illustrate various positions of the hinge of FIG. 4, illustrating the buckling of the spring elements.
Figure 5B:
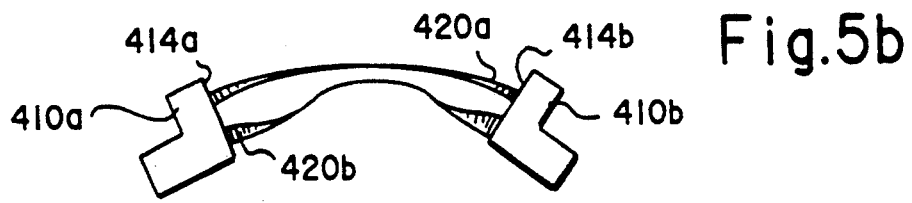
Figure 5C:
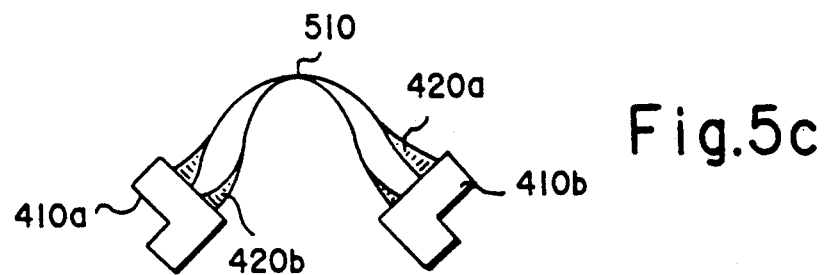

FIG. 5a is a side elevation view of hinge 400 of FIG. 4, in its undeflected state. Spring elements 420a and 420b can be seen to be spaced apart. FIG. 5b illustrates antenna 400 of FIG. 5a in a partially deflected state. As illustrated in FIG. 5b, faces 414a and 414b are no longer parallel, and rotation of the supports has occurred. As described below, this rotation requires the expenditure of energy to buckle spring elements 420a and 420b. In FIG. 5C, the rotation has reached approximately 90°, and the buckled spring elements are in contact with each other in a central region 510.

Depending upon the length, width thickness, curvature, spacing and material of springs elements 420a and 420b, it may be possible to rotate support elements 410a and 410b by more or less than 90° without exceeding the yield point of the spring material. Once the yield point is exceeded, the material will no longer return to its original shape and it usefulness may be limited.

Figure 6A:
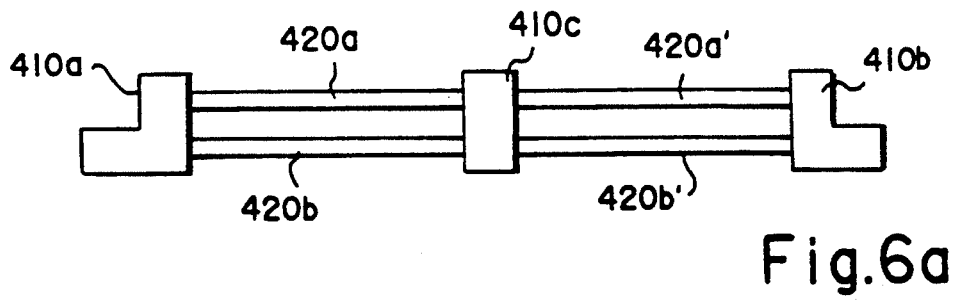
FIGS. 6a and 6b illustrate another embodiment of a hinge in accordance with an aspect of the invention.
Figure 6B:
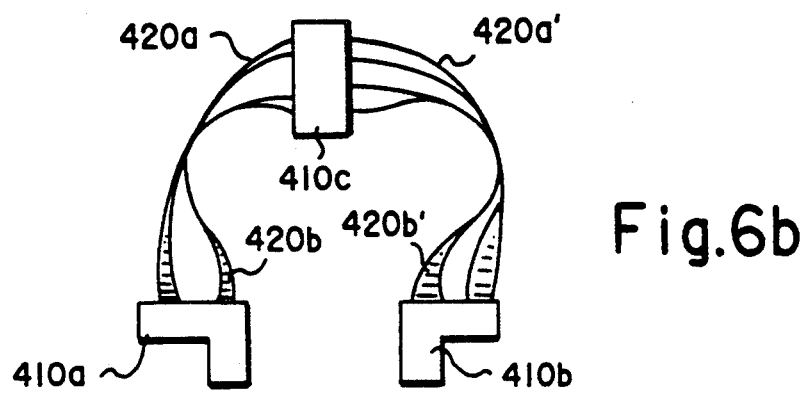

It may be desirable, if the hinge is to be used for 180° of rotation, to stabilize the positions of the spring elements in their deflected condition, by inserting an additional spacing element, which may be similar to a support element 410 of FIG. 4. FIG. 6a illustrates such a hinge in its undeflected state, and FIG. 6b illustrates the hinge in its fully rotated condition. In FIG. 6, elements corresponding to those of FIG. 5 are designated by like references. In FIG. 6a, intermediate support element 410c sets the spacing between spring elements 420a and 420b at their midpoints, and also sets their cross-sectional curvature. In effect, the hinge of FIG. 6 consists of two hinges similar to that of FIG. 5, with one common support element, namely intermediate support element 410c. FIG. 6b illustrates the hinge of FIG. 6a in a rotated or stressed state. The rotation angle is 180°. It is clear that intermediate support element 410c essentially divides the hinge into two separate, independent hinge portions which are coupled together. Spring element 420a may be a continuation of spring element 420a', and likewise 420b may be a continuation of 420b', or they may each be a separate element, coupled together by a rigid connection to intermediate support element 410c. The intermediate support element of the hinge of FIG. 6 is a convenient point of attachment for panels of the array antenna of FIGS. 1 and 2. For example, hinge 216b¹ of FIG. 2b may be similar to that of FIG. 6, with end support elements 410a and 410b attached to antenna panels 12a and 12b, respectively, and with intermediate support element 410c attached to lateral support panel 30b.

Figure 7:
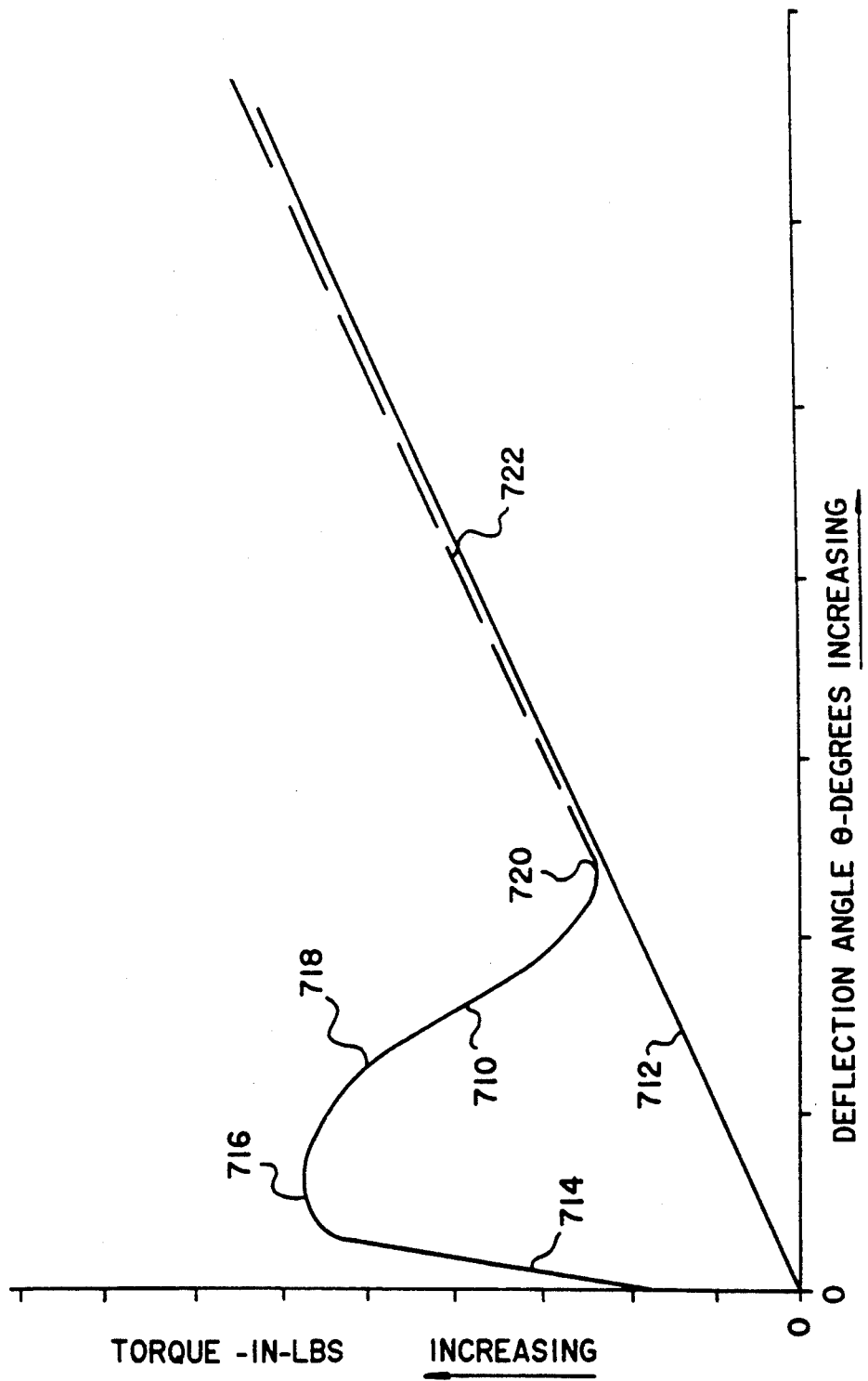
FIG. 7 is a plot of torque versus rotation or deflection angle for the hinge of FIG. 4.

FIG. 7 illustrates a plot of torque versus rotation angle or deflection $\theta$ for the hinge of FIG. 4, with a flat-spring element for comparison. In FIG. 7, plot 710 represents torque versus $\theta$ for the hinge of FIG. 4, and plot 712 represents the torque versus $\theta$ for a flat spring having a thickness corresponding to the combined thickness of the two spring elements of a hinge according to the invention. As illustrated, the flat-spring plot 712 is linear. The hinge of FIG. 4, on the other hand, has a much greater slope in a region 714 starting at the origin, so a much greater torque is required to begin rotation of the inventive hinge than for a flat spring. Point 716 on plot 710 represents the point at which buckling of the curved cross-sections of the spring elements to a flat shape occurs, and a portion 718 of the plot indicates a region in which the torque remains relatively high for the amount of rotation. At point 720, the inventive hinge has torque substantially equal to that of a flat hinge, and that similar torque continues over the remainder of the rotation, as illustrated by portion 722 of the plot.

The hinge of FIG. 4 is particularly advantageous for use with the antenna array of FIG. 1, because of its inherent torque and its torque characteristic, low weight, low parts count, and its manufacturability. More particularly, while pin-and-clevis hinges could be used for the hinged joints of the antenna array of FIG. 1, separate springs or another source of energy would be required in order to deploy the array. Since the hinge of FIG. 4 inherently provides spring energy, no further parts need to be added for deployment. Further, once it is resists forces tending to bend the hinge and thereby deform the array antenna, and bends less in response to such forces than an array using conventional linear springs, as indicated by the high torque region 714 of FIG. 7. Yet further, the array of FIG. 1 can be fabricated in the deployed state in jigs having the required dimensional tolerances, and the antenna when deployed in space will have the same dimensions, because there is no play between elements such as would occur in a pin-and-clevis hinged assembly. This is the origin of the "zero tolerance" nomenclature.

The natural or inherent spring nature of the zero-tolerance hinges aids in deploying the array antenna, as described above. However, the combined spring forces are very strong near the fully deployed condition, and as a result the deployment, if uncontrolled, could reach speeds or conditions near the fully deployed state which might result in damage. The deployment is controlled by a plurality of tapes or ribbons (not illustrated) extending between the two end stiffening panels, 30a and 30c of FIG. 1, and spools coupled to a stepper motor. The motor is controlled to allow the tapes to unwind from the spools to thereby allow the two end panels to separate at a controlled rate. Details of the deployment control arrangement are not illustrated. Such deployment control is well known in the art and no further description is believed necessary.

Figure 8:
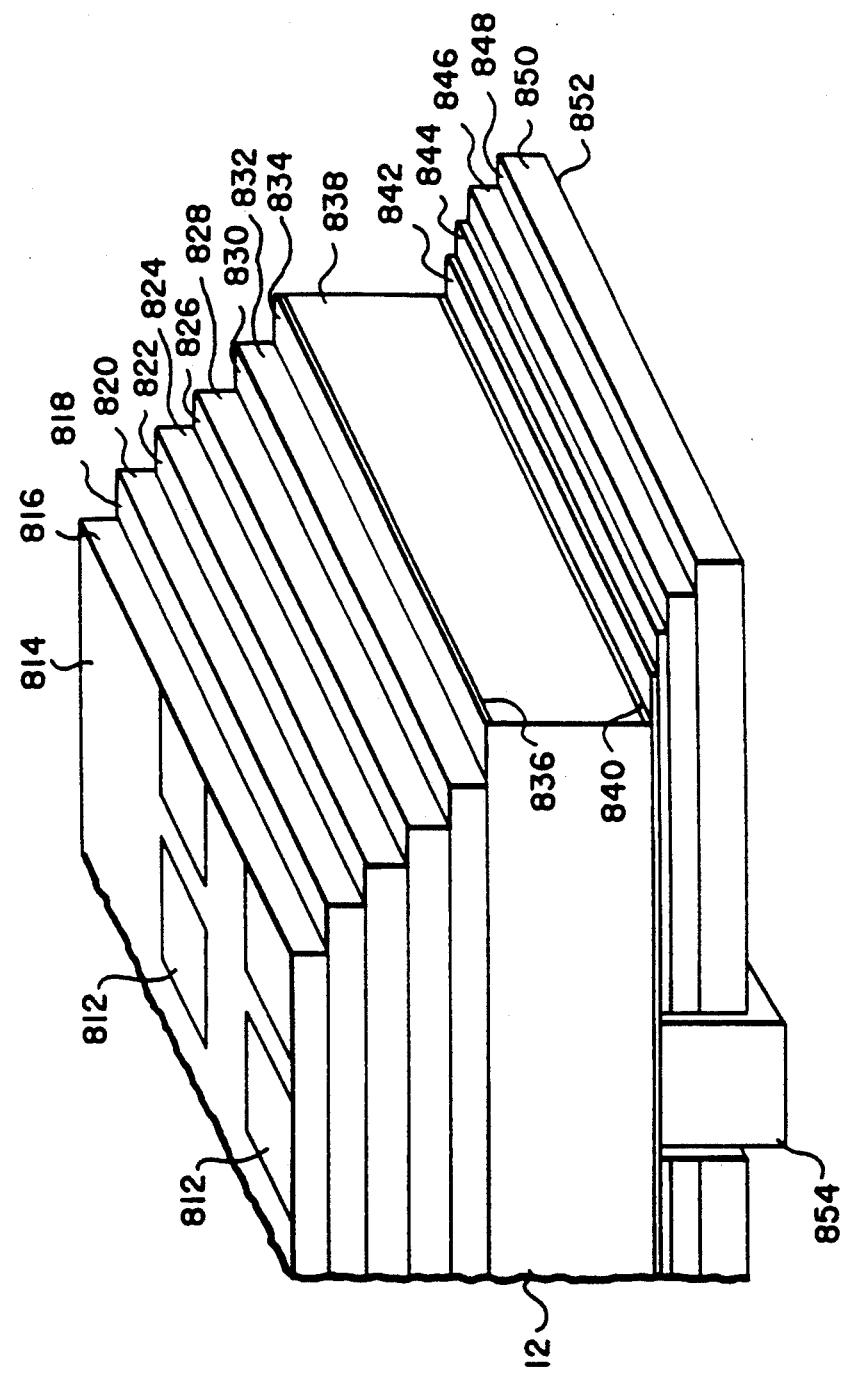
FIG. 8 is a cross-section of an antenna panel which may be used in the antenna of FIG. 1.

FIG. 8 is a simplified perspective or isometric view of a portion of an antenna panel 12 suitable for use in the arrangement of FIG. 1, cut away to illustrate interior details. In FIG. 8, an outer surface of layers of paint, Kapton dielectric film, adhesive, plated or deposited copper radiators 812, copper-to-Kapton adhesive, Kapton film, and adhesive, in the order listed, is designated 814, and has a total thickness of about 0.0265 inch. Surface layers 814 overlie a 0.062 inch layer of Nomex dielectric honeycomb. Below Nomex honeycomb 816, layers of adhesive, copper ground plane, copper-to-Kapton adhesive, Kapton film, and adhesive, in the order listed, are illustrated as 818, and have a total thickness of about 0.011 inch. Another layer of Nomex honeycomb with 0.062 inch thickness is represented as 820. Layers of adhesive, copper circuit paths used for RF power distribution for a first radiated polarization, copper-to-Kapton adhesive, Kapton, and adhesive, in the order listed, are designated together as 822. Layers 822 have a total thickness of about 0.011 inch, and overlie a further 0.062 inch layer 824 of Nomex dielectric. Further layers of adhesive, copper ground plane, copper-to-Kapton adhesive, Kapton, and adhesive, designated together as 826, have a total thickness of about 0.011 inch, and overlie a 0.062 inch layer 828 of Nomex. Layers of adhesive, copper circuit paths for a second polarization, copper-to-Kapton adhesive, Kapton film, and adhesive, designated together as 830, have a total thickness of about 0.011 inch, and overlie a 0.062 inch layer 832 of Nomex. Layers of adhesive, copper ground plane, copper-to-Kapton adhesive, Kapton film, and adhesive, designated together as 834, have a combined thickness of about 0.011. Reference numerals 836, 838 and 840 together represent a sandwich of a 0.250 inch aluminum honeycomb with 0.025 inch carbon-reinforced epoxy face layers. Layers of adhesive, Kapton film, Kapton-to-copper adhesive, and copper ground plane are represented together as 842, and have a total thickness of about 0.007 inch. Layers of adhesive, Kapton film, Kapton-to-copper adhesive, and copper DC power paths for powering TR modules, described below, have a total thickness of about 0.007 inch, and the layers are designated 844. Layers of adhesive, Kapton film, Kapton film, Kapton-to-copper adhesive, copper ground plane, and adhesive, designed 846, have a total thickness of about 0.011 inch. A layer of Nomex honeycomb 0.062 inch thick is designated 846. Layers of adhesive, Kapton film, Kapton-to-copper adhesive, copper circuit paths, and adhesive, designated together as 848, have a total thickness of about 0.011 inch, and overlie a 0.062 inch layer 850 of Nomex. The circuit paths of layer 848 may be used for control or other purposes. The lowermost combination layer 852, only the edge of which is visible in FIG. 8, includes adhesive, copper ground plane, adhesive and Kapton film. The total thickness of the panel illustrated in FIG. 8 is about 0.863 inch. Transmit-receive (TR) or frequency converter modules, one of which is illustrated as 854, may be connected by through vias (vertical electrical connections among the various layers) to the antennas. The overall thickness including the TR modules is about 0.944 inch.

In one embodiment of the invention, the antenna panels are expected to be similar to that of FIG. 8, with each antenna panel having a length of about 13 feet and a width of about 30 inches. Twenty-four such panels are hinged along their long sides in the general manner illustrated in FIG. 1 to make an array 60 feet long and 13 feet wide. It is anticipated that each panel will require coolant flow to extract heat from the many TR modules. The coolant pipes are expected to extend through the aluminum honeycomb layer, and in a heat pipe embodiment, heat rejection may take place at various locations on the antenna panel itself. This embodiment uses the carbon-fiber reinforced epoxy zero-tolerance hinges as described above, with each spring element having a thickness of 0.010 inch, a length of 2 inches and a width measured along the surface (as opposed to a projected width) of 2 inches, and a 5-inch radius of curvature, with the spring elements of each hinge spaced apart by about 0.2 inches (at the edges) in the unstressed condition. This spring configuration and spacing corresponds to a spring-to-spring spacing of about 0.4 inches at the peak of the arch. The spring elements are made from type T300 60% density graphite fiber fabric impregnated with uncured resin, available from many sources but particularly from ICI Fiberite Corp., whose address is P.O. Box 1257, 4300 Jackson Street, Greenville, Tex.75401. This material is formed to shape on a curved mandrel and cured by baking at 500° F. The entire deployable antenna is fabricated in precisely dimensioned jigs and when completed, the structure is folded. The hinges may be buckled directly by application of torque, but the forces required are much reduced if the spring elements of each hinge are "pinched" together. For a single hinge, this may be done with the fingers. When large numbers of such hinges are used, as in the described array antenna, all the hinges should be pinched simultaneously. This is accomplished by threading a pair of rubber or other elastic tubes, twisted together, through the structure, and around each hinge. When inflated by pneumatic pressure, the tubes expand and pinch all the spring elements simultaneously to reduce the forces required to collapse the structure to the stowed state. Such a structure, when deployed, assumes the precise dimensions of the assembly jig, and is very reliable because of its low parts count.

Connections of radio-frequency (RF) energy among the panels may be made by flexible coaxial cables, flexible stripline, or other suitable transmission be formed upon the opposite sides of a spring element. Power connections for any RF power amplifiers or converters may be similarly distributed between panels by flexible power conductors. In a solar panel embodiment of the invention, flexible power cables may be routed among the panels for collecting electrical energy therefrom.

Figure 9A:
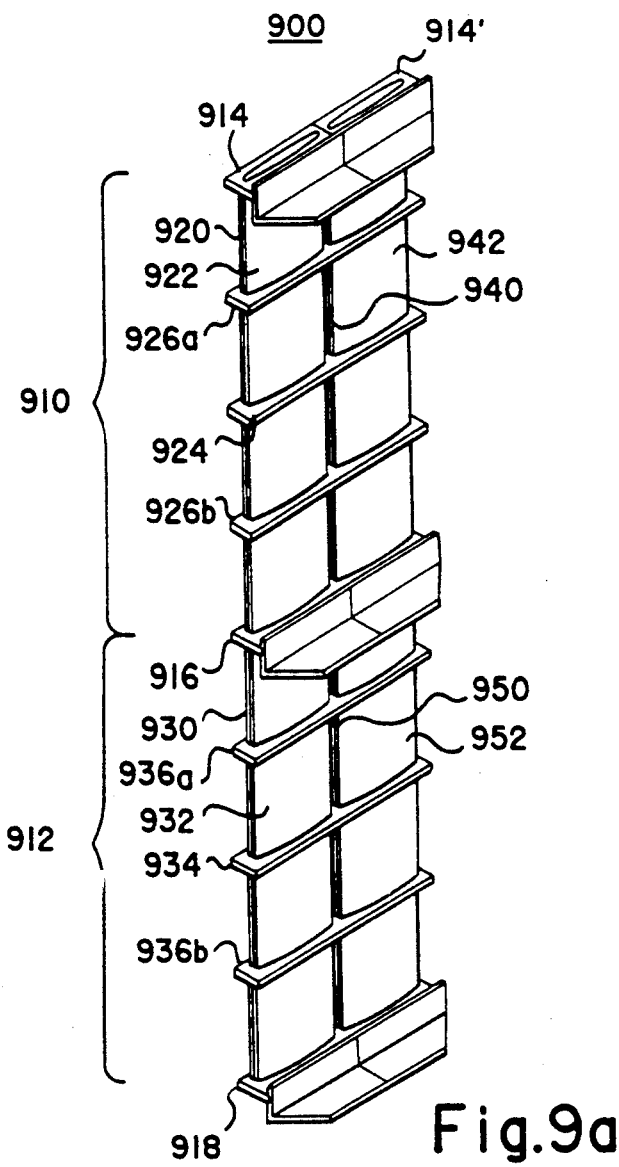
FIGS. 9a and 9b are perspective or isometric views of a mast according to an aspect of the invention, in the extended or deployed state and in the collapsed or stowed state, respectively.

FIG. 9 illustrates a stowable and deployable mast in accordance with the invention. The mast of FIG. 9 may be used alone for certain purposes, and it may be used as a structural element in the masts of FIGS. 10, 11, 12, and 13. In FIG. 9a, a first extensible mast section or element 910 includes a top fastening element 914 and a base fastening element 916. Mast section 912 includes a top fastening element which is common with element 916, and also includes its own base fastening element 918. Mast sections 910 and 912 are cascaded so that, if base fastening element 918 is fixed in position, extension of mast section 912 causes translation of mast section 910. A pair of spring elements 920 and 922 extends from top fastening element 914 to base fastening element 916. Spring elements 920 and 922 are curved and spaced apart as described in conjunction with FIG. 4. A central intermediate support element 924 provides support for spring elements 920 and 922 at a location between upper fastening element 914 and lower fastening element 916, in a manner similar to the central support element of FIG. 6. Further intermediate support elements 926a and 926b are located between upper fastening element 914 and central support element 924, and between central support element 924 and lower fastening element 916, respectively. In a similar fashion, lower mast section 912 include a pair of curved, spaced-apart spring elements 930 and 932, a central intermediate support element 934, and further intermediate support elements 936a and 936b.

It is apparent that fastening element 916 is the lower or base fastening element for upper mast section 910, and is also the upper fastening element for lower mast section 912. Fastening element 916 may be formed by actual physical connection of two separate elements, or a single unitary fastening element may be used. Similarly, spring elements 920 and 922 may extend all the way from top fastening element to base fastening element 916, and separate spring elements 930 and 932 may extend fastening element 916 to base element 918. Alternatively, spring element 930 may be an extension of spring element 920, and spring element 932 may be an extension of spring element 922.

Figure 9C:
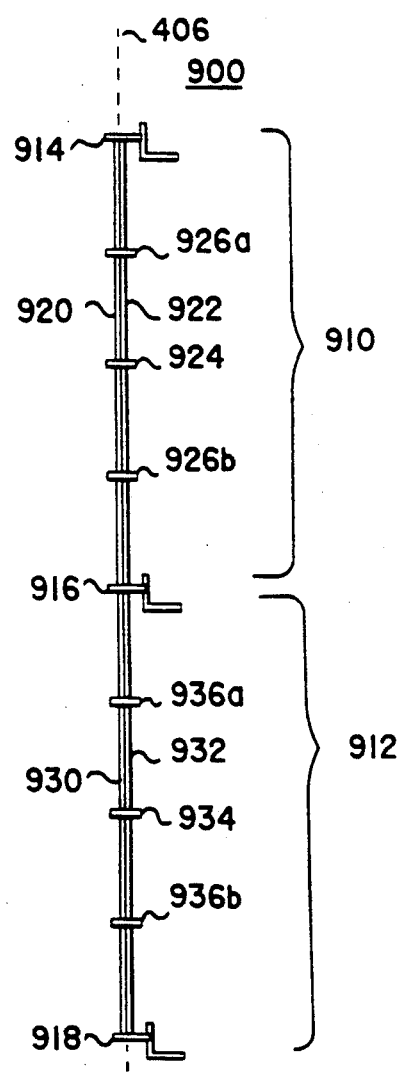

FIG. 9c is a side elevation view of extended or deployed mast 900 of FIG. 9a. A plane of symmetry 406 extends between spring elements 920 and 922, and between elements 930 and 932.

Figure 9B:
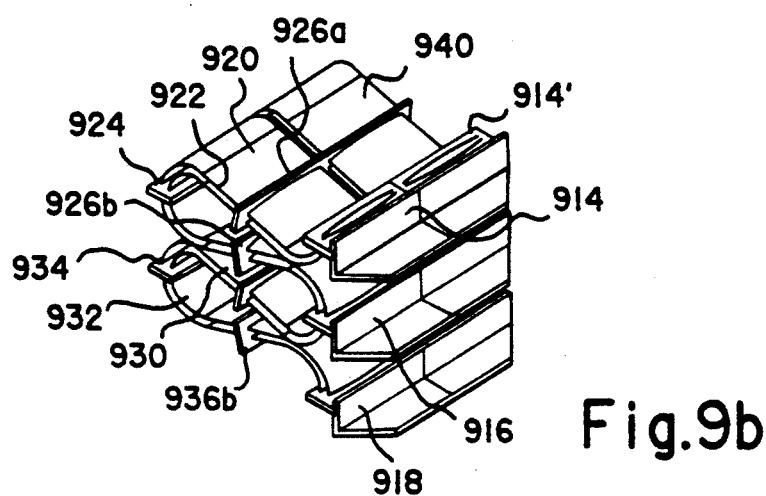

Mast 900 may be collapsed to a stowed state, illustrated in FIG. 9b. In FIG. 9b, the relative orientations of fastening elements 914, 916 and 918 remain unchanged, but they are adjacent or adjoining, because the spring elements have been collapsed by the FIG. 9d is a side elevation view of the stowed state, in which the "rotation" is more clear. In particular, that portion of spring elements 920, 922 of mast section 910 which lies between upper fastening element 914 and intermediate fastening element 926a is rotated about 90° clockwise (CW) that portion between intermediate fastening elements 926a and 924 is rotated about 90° counterclockwise (CCW), that portion lying between intermediate fastening elements 924 and 926b is rotated about 90° CCW, and that portion lying between intermediate fastening element 926b and fastening element 916 is rotated about 90° CW, so the net rotation of the top and base fastening elements 914 and 916 is zero, but the effective vertical length of the spring elements is reduced. The same pattern of rotation applies to corresponding portions of mast section 912.

The natural spring of the spring elements in the stowed state tends to cause the mast to assume the deployed state illustrated in FIGS. 9a and 9c. Naturally, the mast may carry a load such as an antenna or instrument. A retaining method may be used to hold the antenna in the stowed position until the appropriate deployment time. Also, more than two sections may be cascaded, to achieve greater deployed length.

The particular dimensions and curvature of the spring elements 920 and 922, and 930 and 932, determine both the forces available to extend the mast and the load-bearing capability when the mast is deployed. If greater load-bearing capability or extension forces are required than would be provided by a particular dimensioning, it would be possible to design new spring elements. However, once a spring element is designed, and its parameters are known, it may be advantageous to use a plurality of such spring elements in order to achieve the desired forces and load-bearing capability, rather than to design and qualify a new spring element. For this reason, the mast sections illustrated in FIG. 9a include a further set of spring elements 940, 942 and 950, 952 connected into the same top and base fastening elements. In particular, the upper end of spring elements 940 and 942 are connected into a portion of upper fastening element 914', which is a portion, or integral with upper fastening element 914.

In FIG. 10, a two-section extensible mast has a triangular cross-section and uses three two-section extensible masts such as 900 of FIG. 9. The mast sections 900 in FIG. 10a are designated 900, 900', and 900". At each junction between mast sections of a mast portion 900, the fastening element is connected to a triangular coupling member, designated 1010 in FIG. 10. As illustrated in FIG. 10, coupling element 1010 is hollow, which may be advantageous for situations in which an antenna is to be deployed, and a transmission line must be carried through the mast structure. It will be clear that planes of symmetry, corresponding to plane 406 of FIGS. 4 and 9, portions of which are illustrated as 1006 and 1006" in FIG. 10a, are mutually skewed.

Figure 11A:
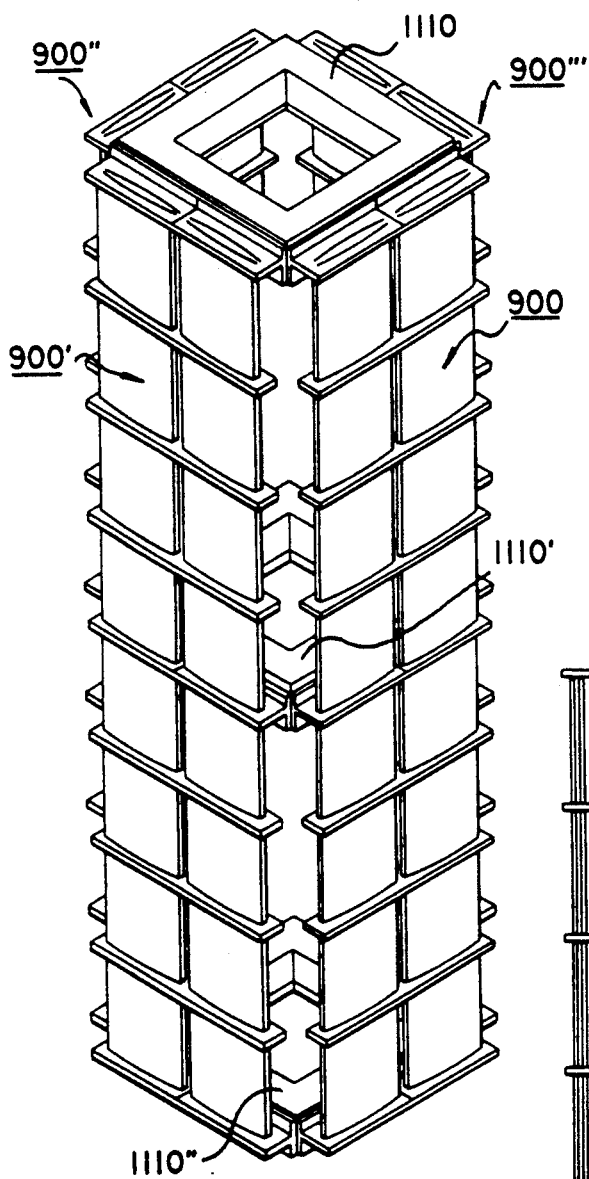
FIG. 11a is a perspective or isometric view in the deployed state.
Figure 11B:
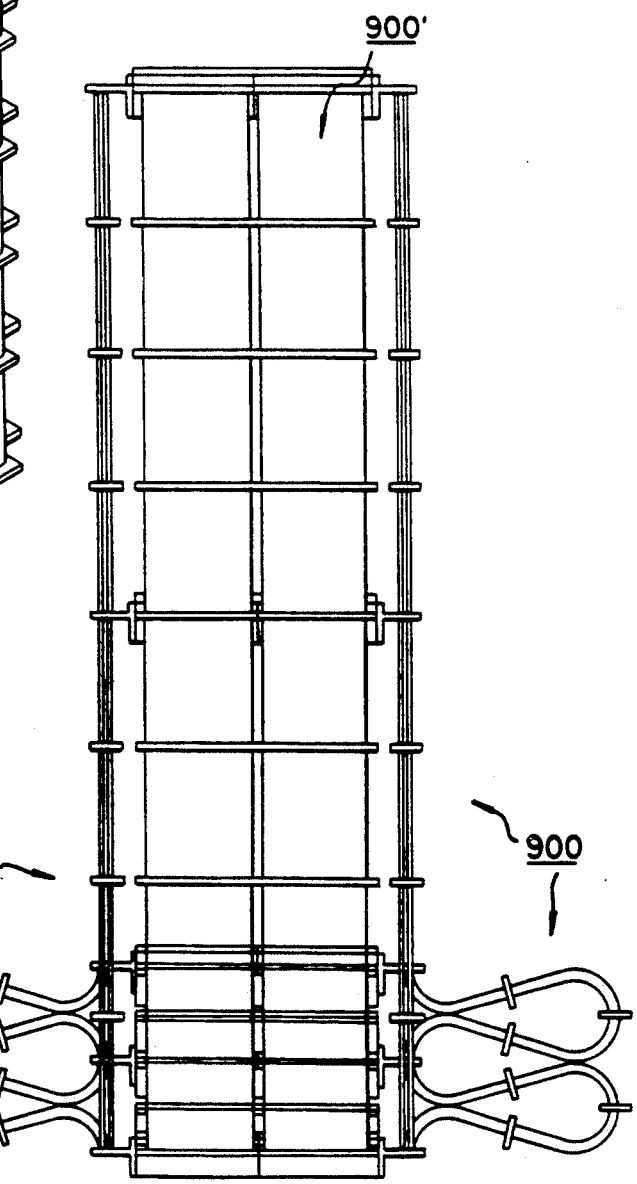
FIG. 11b is a side elevation view of the mast of FIG. 11a in a partially stowed state.
Figure 12A:
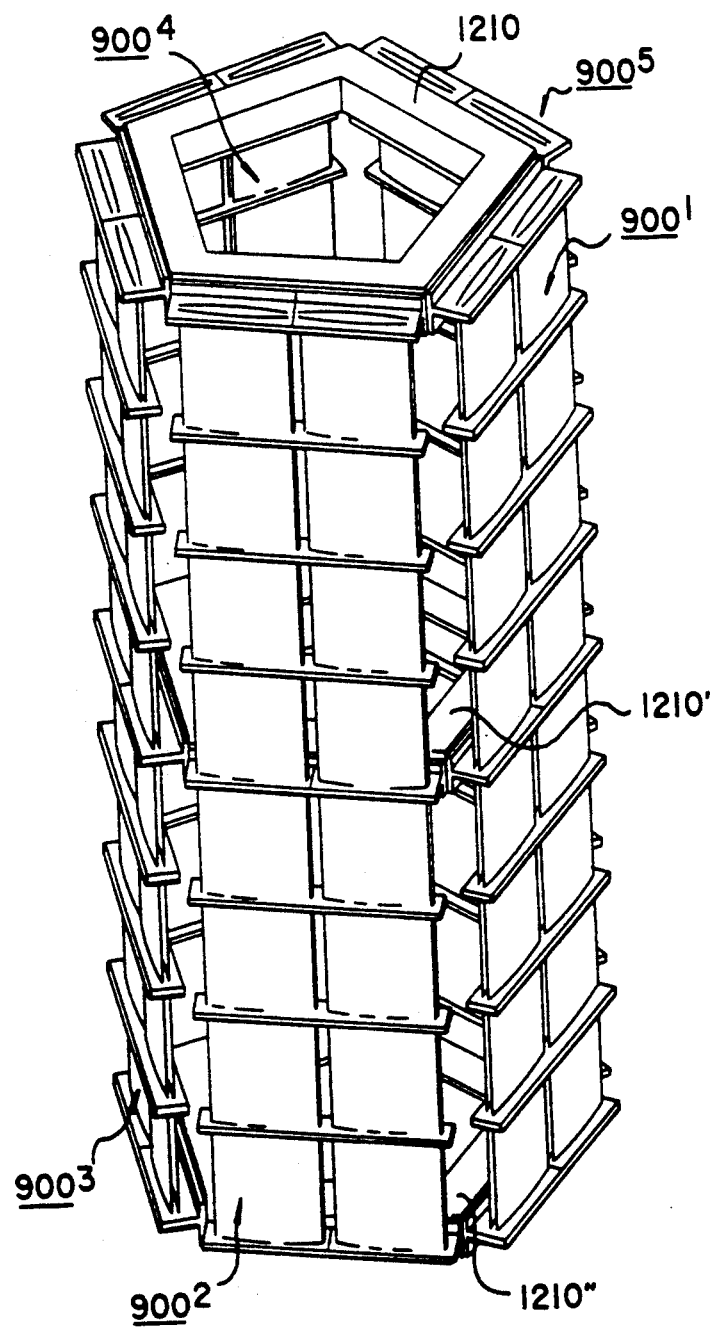
FIGS. 12a and 12b are perspective or isometric views of a pentagonal mast according to an aspect of the invention, in the deployed and stowed state, respectively.
Figure 12B:
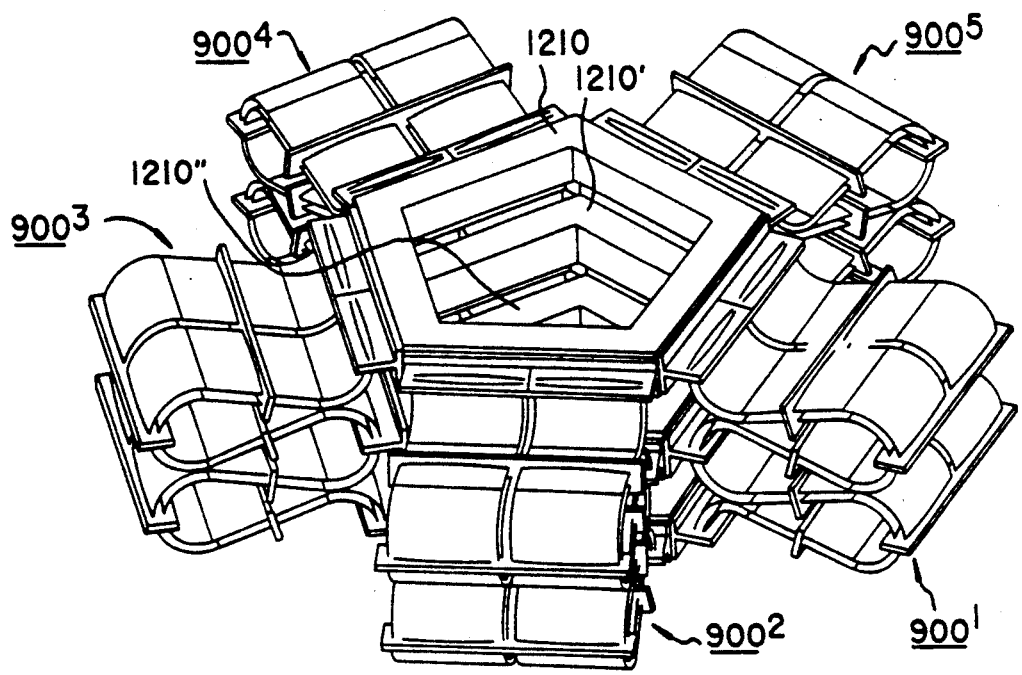
Figure 12C:
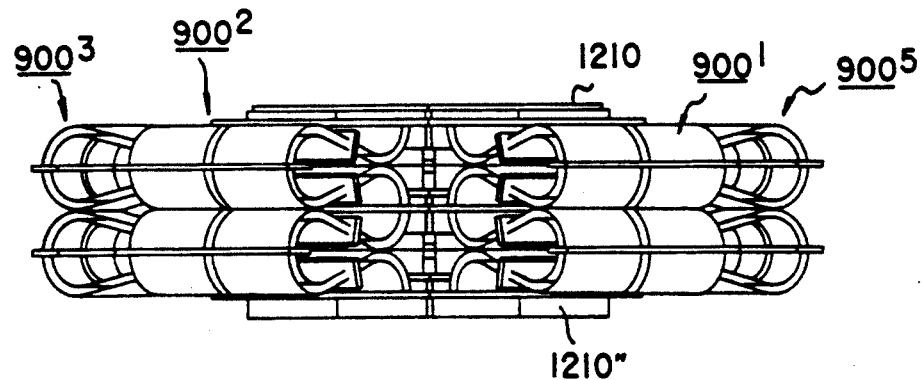
FIG. 12c is a side elevation view of the mast of FIG. 12b.
Figure 13A:
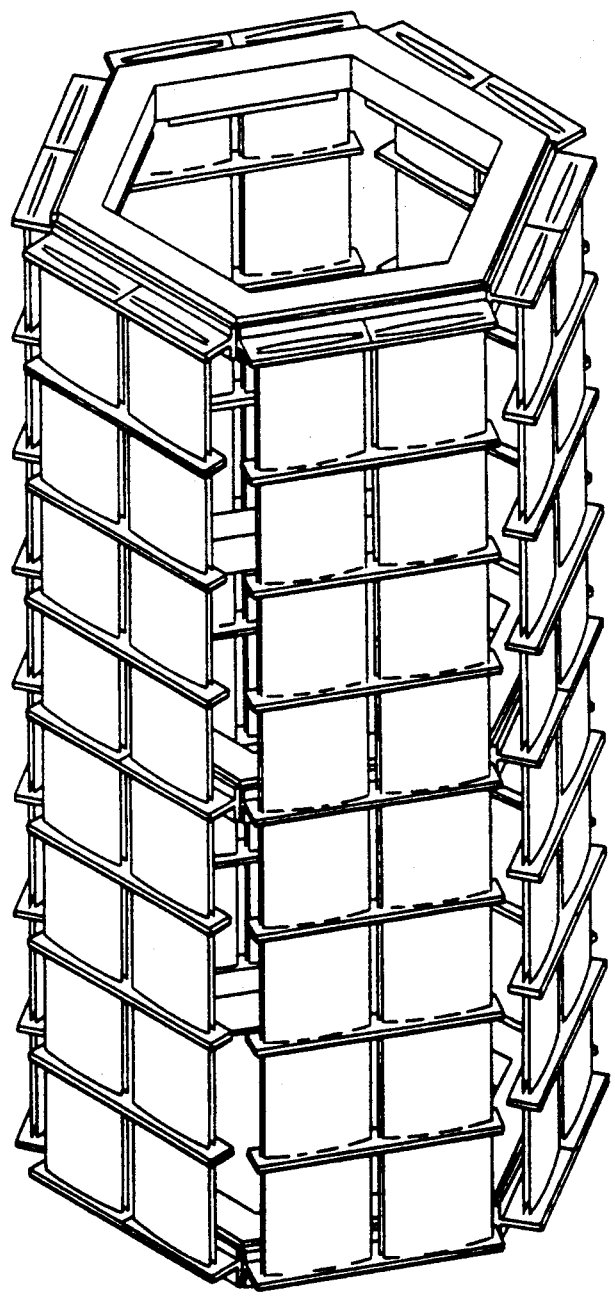

FIG. 11 illustrates a two-section mast with a square cross-section, which used four mast elements 900. In FIG. 11, mechanical coupling is provided by square coupling elements 1110, 1110', 1110", which hold four extensible masts 900, 900', 900" and 900'" in position. FIG. 11b illustrates the lower mast section collapsed and the upper mast section extended. FIG. 12 illustrates a pentagonal extensible mast including five extensible masts $900^1$, $900^2$, $900^3$, $900^4$ and $900^5$. The masts are held together by pentagonal coupling elements 1210. Similarly, FIG. 13 illustrates a hexagonal extensible mast using six masts corresponding to 900 of FIG. 9. Separate designations are not included in FIG. 13.

FIG. 14a illustrates, partially exploded, two sections of triangular extensible masts similar to those of FIG. 10, with taper or wedge-shaped coupling elements 1410, 1410' to which the various mast portions 900 are affixed. Coupling element 1410 is wedge-shaped, so that the mast segments when extended are not coaxial, but so that the axes turn at each coupling element 1410. In this manner, piecewise approximations to a curve can be assumed by deployable structural elements. A structural element such as that illustrated in FIG. 14a could be a structural rib for support of a parabolic antenna or for other structural elements requiring curvature. FIG. 14b is a side elevation view of coupling element 1410.

Other embodiments of the invention will be apparent to those skilled in the art. For example, more than six elements may be used with corresponding coupling elements to make extensible masts as described above with cross-sections having other polygonal shapes. The polygonal shapes do not necessarily have to be regular (i.e. symmetrical), if the loads which have to be carried are greater on one side than on the other.

What is claimed is:

1. An array antenna deployable from a stowed state, comprising:

a first plurality of mutually similar, flat, rectangular antenna panels, upon each of which antenna panels at least one flat antenna is disposed, each of said antenna panels defining a thickness dimension associated with its shortest sides, a width dimension associated with second sides, which width dimension is greater than said thickness dimension, and a length dimension associated with its longest sides, which length dimension is greater than said width dimension, each of said antenna panels including a hinged connection to at least one other of said antenna panels, said connection being made along one of said longest sides, to thereby define plural hinged connections and a pair of free ends, said plurality of antenna panels being in a coplanar condition in a deployed state of said array antenna, and being folded along said hinged connections accordian-style in a stowed state of said array antenna, the volume of said antenna in said stowed state being directly related to said thickness dimension, whereby it is desirable to reduce said thickness of said antenna panels to reduce said stowed volume, but the stiffness of said antenna panels is itself thereby reduced so that said antenna array may, in said deployed state, undesirably be deflected away from said coplanar condition;

a second plurality, smaller in number than said first plurality, of mutually similar, flat, rectangular lateral stiffening panels, each of said lateral stiffening panels defining a thickness dimension associated with its shortest sides, a width dimension associated with its second sides, which width dimension is greater than said thickness dimension, and a length dimension associated with its longest sides, which length dimension is greater than said width dimension, each of said lateral stiffening panels being associated with either (a) one of said free ends or (b) one of alternate ones of said hinged connections, each of said stiffening panels being hingedly joined along one of its long sides to its associated one of said free ends and said alternate ones of said hinged connections; and a plurality of mutually similar, flat, rectangular, foldable longitudinal stiffening panels, each of said longitudinal stiffening panels being capable of assuming a folded state and an unfolded state, each of said longitudinal stiffening panels in said unfolded state defining a thickness dimension associated with its shortest sides, a width dimension associated with its shortest sides, which width dimension associated with its second sides, which width dimension is greater than said thickness dimension, and a length dimension associated with its longest sides, which length dimension is greater than said width dimension and which is also substantially equal to twice said width dimension of one of said antenna panels, each of said longitudinal stiffening panels being foldable along a line extending parallel to, and midway between, said second sides of said longitudinal stiffening panel, each of said longitudinal stiffening panels having one of its said second sides hingedly attached, at a location, to one of said lateral stiffening panels along a line parallel to one of said second sides of said one of said lateral stiffening panels, and the other one of its said second sides hingedly attached, at a corresponding location, to the next adjacent one of said lateral stiffening panels.

2. An array antenna according to claim 1, wherein an even number of said longitudinal stiffening panels is hingedly attached to each of said lateral stiffening panels.

3. An array antenna according to claim 2, wherein said even number is four.

4. An array antenna according to claim 1, wherein said first plurality is an even number, and said second plurality is equal to half of said first plurality plus one.

5. An array antenna according to claim 1, wherein at least a first one of said panels is attached to a second one of said panels by a hinge arrangement for allowing relative rotation between said panels, wherein said hinge arrangement comprises:

a first planar region associated with said first panel, said first planar region defining first and second elongated, curved recesses spaced on either side of a point on said first planar region, said first and second curved recesses being concave on their sides facing said point;

a second planar region associated with said second panel, said second planar region being parallel with said first planar region and spaced apart therefrom by a predetermined distance in one state of rotation of the hinge arrangement, said second planar region defining first and second elongated, curved recesses spaced on either side of a point on said second planar region, said first and second curved recesses being concave on their sides facing said point;

first and second springs, each defining a length dimension, each of said springs, when unstressed, having a curvature in a plane orthogonal to said length dimension which matches that of said first planar region, and which also matches the curvature of said first and second recesses, respectively, in said second planar regions, the ends of said first spring being retained in said first recesses in said first and second planar regions, and the ends of said second spring being retained in said second recesses in said first and second planar regions, whereby said first and second panels may rotate about a line parallel to at least one of said first and second planar regions, which line, in said one state of rotation, lies midway between said first and second planar regions in an orientation approximately orthogonal to a line extending between said points, said rotation resulting from buckling of at least one of said springs.

6. An arrangement according to claim 5 wherein said first and second curved recesses in said first planar region have equal radii of curvature.

7. An arrangement according to claim 5 wherein said first curved recesses in said first and second planar region have equal radii of curvature.

8. An arrangement according to claim 5 wherein said length dimensions of said first and second springs are equal.

9. An arrangement according to claim 5, wherein said first and second curved recesses in said first and second planar regions have equal radii of curvature, and the length dimensions of said first and second springs are equal.

10. An arrangement according to claim 5, wherein said first and second curved recesses in said first planar region are equidistant from said point on said first planar region.

11. An arrangement according to claim 10, wherein the ends of said first and second recesses in said first planar region are equidistant from said point in said first planar region.

12. An arrangement according to claim 5 wherein said springs are formed, at least in part, from carbon-fiber reinforced resin.

13. An antenna according to claim 1, wherein each of said antenna panels includes a layer of conductive ground plane, a layer of conductive circuit paths, and a dielectric layer lying between said layer of conductive ground plane and said layer of conductive circuit paths.

14. A solar array deployable from a stowed state, comprising:

a first plurality of mutually similar, flat, rectangular antenna panels, upon each of which solar cell panels at least one flat solar cell is disposed, each of said solar cell panels defining a thickness dimension associated with its shortest sides, a width dimension associated with second sides, which width dimension is greater than said thickness dimension, and a length dimension associated with its longest sides, which length dimension is greater than said width dimension, each of said solar cell panels including a hinged connection to at least one other of said solar cell panels, said connection being made along one of said longest sides, to thereby define plural hinged connections and a pair of free ends, said plurality of solar cell panels being in a coplanar condition in a deployed state of said array of solar cells, and being folded along said hinged connections accordian-style in a stowed state of said array of solar cells, the volume of said solar cell panels in said stowed state being directly related to said thickness dimension, whereby it is desirable to reduce said thickness of said solar cell panels to reduce said stowed volume, but the stiffness of said solar cell panels is itself thereby reduced so that said solar cell array may, in said deployed state, undesirably be deflected away from said coplanar condition;

a second plurality, smaller in number than said first plurality, of mutually similar, flat, rectangular lateral stiffening panels, each of said lateral stiffening panels defining a thickness dimension associated with its shortest sides, a width dimension associated with its second side, which width dimension is greater than said thickness dimension, and a length dimension associated with its longest side, which length dimension is greater than said width dimension, each of said lateral stiffening panels being associated with either (a) one of said free ends or (b) one of alternate ones of said hinged connections, each of said stiffening panels being hingedly joined along one of its long sides to its associated one of said free ends and said alternate ones of said hinged connections; and a plurality of mutually similar, flat, rectangular, foldable longitudinal stiffening panels, each of said longitudinal stiffening panels being capable of assuming a folded state and an unfolded state, each of said longitudinal stiffening panels in said unfolded state defining a thickness dimension associated with its shortest sides, a width dimension associated with its second sides, which width dimension is greater than said thickness dimension, and a length dimension associated with its longest sides, which length dimension is greater than said width dimension and which is also substantially equal to twice said width dimension of one of said solar cell panels, each of said longitudinal stiffening panels being foldable along a line extending parallel to, and midway between, said second sides of said longitudinal stiffening panel, each of said longitudinal stiffening panels having one of its said second sides hingedly attached, at a location, to one of said lateral stiffening panels along a line parallel to one of said second sides of said one of said lateral stiffening panels, and the other one of its said second sides hingedly attached, at a corresponding location, to the next adjacent one of said lateral stiffening panels.

* * * * *